US011743529B2

(12) United States Patent
Horiguchi

(10) Patent No.: US 11,743,529 B2
(45) Date of Patent: *Aug. 29, 2023

(54) DISPLAY CONTROL METHOD, TERMINAL, AND NON-TRANSITORY COMPUTER READABLE RECORDING MEDIUM STORING A COMPUTER PROGRAM

(71) Applicant: LINE Corporation, Tokyo (JP)

(72) Inventor: Naoto Horiguchi, Tokyo (JP)

(73) Assignee: LINE Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/123,785

(22) Filed: Dec. 16, 2020

(65) Prior Publication Data
US 2021/0105525 A1 Apr. 8, 2021

Related U.S. Application Data

(63) Continuation of application No. 16/157,884, filed on Oct. 11, 2018, now Pat. No. 10,904,608, which is a
(Continued)

(30) Foreign Application Priority Data

Apr. 14, 2016 (JP) .................................. 2016-081399

(51) Int. Cl.
*H04N 21/431* (2011.01)
*H04N 21/472* (2011.01)
(Continued)

(52) U.S. Cl.
CPC .......... *H04N 21/4316* (2013.01); *G09G 5/00* (2013.01); *G09G 5/36* (2013.01); *H04N 5/91* (2013.01);
(Continued)

(58) Field of Classification Search
CPC ........ H04N 21/4316; H04N 5/93; H04N 5/91; H04N 21/47205; H04N 21/4728;
(Continued)

(56) References Cited

U.S. PATENT DOCUMENTS 9,413,710 B1* 8/2016 Saylor ................. H04L 65/1069
2004/0070678 A1* 4/2004 Toyama ............. H04N 1/00148
707/E17.026
(Continued)

FOREIGN PATENT DOCUMENTS

JP 2006140901 A 6/2006
JP 2007013658 A 1/2007
(Continued)

OTHER PUBLICATIONS

International Search Report for International Application No. PCT/JP2017/015246 dated Jul. 11, 2017.
(Continued)

*Primary Examiner* — Kunal Langhnoja
(74) *Attorney, Agent, or Firm* — Harness, Dickey & Pierce, P.L.C.

(57) ABSTRACT

A display control method executed by a terminal, the terminal including a display including a screen and at least one processor, the method including displaying, using the at least one processor, a first video content on a first area of the screen; generating, using the at least one processor, a screenshot of the first area of the screen in response to accepting a command to capture an image of the first video content being played back; and displaying, using the at least one processor, the generated screenshot in a second area of the screen. When the screenshot is displayed in the second area, the first video content continues to be played back in the first area of the screen.

20 Claims, 23 Drawing Sheets

Related U.S. Application Data continuation of application No. PCT/JP2017/015246, filed on Apr. 14, 2017.

(51) Int. Cl.

| | | |
|---|---|---|
| *H04N 21/4728* | (2011.01) | |
| *H04N 21/81* | (2011.01) | |
| *G09G 5/36* | (2006.01) | |
| *H04N 5/93* | (2006.01) | |
| *G09G 5/00* | (2006.01) | |
| *H04N 5/91* | (2006.01) | |
| *G09G 5/377* | (2006.01) | |
| *G09G 5/14* | (2006.01) | |

(52) U.S. Cl.
CPC ........... *H04N 5/93* (2013.01); *H04N 21/4728* (2013.01); *H04N 21/47205* (2013.01); *H04N 21/8153* (2013.01); *G09G 5/14* (2013.01); *G09G 5/377* (2013.01); *G09G 2340/12* (2013.01)

(58) Field of Classification Search
CPC ............. H04N 21/8153; H04N 21/431; H04N 21/472; G09G 5/36; G09G 5/00; G09G 2340/12; G09G 5/377; G09G 5/14
See application file for complete search history.

(56) References Cited

U.S. PATENT DOCUMENTS

| | | |
|---|---|---|
| 2008/0227383 A1 | 9/2008 | Hino |
| 2014/0002389 A1 | 1/2014 | Kim et al. |
| 2014/0176487 A1 | 6/2014 | Kikuchi |
| 2017/0212670 A1* | 7/2017 | Shimizu .............. G06F 3/04845 |
| 2017/0280200 A1* | 9/2017 | Sharma ................ H04N 21/482 |
| 2019/0173939 A1* | 6/2019 | Lewis ................... H04L 67/306 |

FOREIGN PATENT DOCUMENTS

| | | |
|---|---|---|
| JP | 2008027049 A | 2/2008 |
| JP | 2008228122 A | 9/2008 |
| JP | 2015058072 A | 3/2015 |
| KR | 10-2014-0003115 A | 1/2014 |
| WO | WO-2013035834 A1 | 3/2013 |
| WO | WO-2016017420 A1 | 2/2016 |

OTHER PUBLICATIONS

Japanese Office Action for PCT/JP2017/015246 dated Nov. 4, 2017.
Korean Office Action dated Feb. 25, 2020 for corresponding Korean Application No. 10-2018-7029825.

\* cited by examiner

FIG.8A

| DATE AND TIME OF GENERATION | CAPTURED IMAGE DATA |
|---|---|
| 2016/03/27 14:00:05 | AAA.jpg |
| 2016/03/28 10:03:10 | BBB.jpg |
| 2016/03/28 14:06:15 | CCC.jpg |
| 2016/03/29 09:13:10 | DDD.jpg |

| DATE AND TIME OF GENERATION | SCREENSHOT | ID OF VIDEO CONTENT | POSITION | URL OF VIDEO CONTENT |
|---|---|---|---|---|
| 2016/03/28 14:06:15 | CCC.jpg | #123 | 06:15 | http://~ |
| 2016/03/29 09:13:10 | DDD.jpg | #321 | 13:10 | http://~ |

| VIDEO CONTENT ID | ELAPSED TIME SINCE START OF PLAYBACK | THE NUMBER OF ACCEPTED OPERATIONS |
|---|---|---|
| | ⋮ | ⋮ |
| #1 | 00:08:01 | 8 |
| | 00:08:02 | 15 |
| | 00:08:03 | 7 |
| | 00:08:04 | 3 |
| | ⋮ | ⋮ |
| | 00:16:21 | 18 |
| | 00:16:22 | 35 |
| | 00:16:23 | 12 |
| | 00:16:24 | 8 |
| | ⋮ | ⋮ |
| | 00:27:15 | 12 |
| | 00:27:16 | 20 |
| | 00:27:17 | 28 |
| | 00:27:18 | 14 |
| | ⋮ | ⋮ |

| VIDEO CONTENT ID | MAIN PART | | | HIGHLIGHT PARTS | | | | | 142 |
|---|---|---|---|---|---|---|---|---|---|
| | VIDEO CONTENT | THUMBNAIL SET POSITION | THUMBNAIL | HIGHLIGHT ID | DISPLAYED TITLE | TIME SETTING | THUMBNAIL SET POSITION | THUMBNAIL | |
| #1 | xxx.mpg | 00:16:22 | xxx.jpg | #1-1 | PLAY BACK HIGHLIGHT (FIRST PART) | 00:06:00 ~ 00:08:30 | 00:08:02 | xyz.jpg | |
| | | | | #1-2 | PLAY BACK HIGHLIGHT (MIDDLE PART) | 00:15:00 ~ 00:18:00 | 00:16:22 | yzx.jpg | |
| | | | | #1-3 | PLAY BACK HIGHLIGHT (LAST PART) | 00:26:00 ~ 00:26:30 | 00:27:17 | zxy.jpg | |

DISPLAY CONTROL METHOD, TERMINAL, AND NON-TRANSITORY COMPUTER READABLE RECORDING MEDIUM STORING A COMPUTER PROGRAM

CROSS-REFERENCE TO RELATED APPLICATIONS

This U.S. non-provisional application is a continuation application of, and claims the benefit of priority under 35 U.S.C. § 120 to U.S. patent application Ser. No. 16/157,884, filed on Oct. 11, 2018, which is a continuation application and claimed the benefit of priority under 35 U.S.C. § 365(c) to International Application PCT/JP2017/015246 filed on Apr. 14, 2017, and designated the U.S., which is based upon and claims the benefit of priority to Japanese Patent Application No. 2016-081399 filed on Apr. 14, 2016, the entire contents of each of which are incorporated herein by reference.

FIELD

Various example embodiments relate to a display control method, a terminal, and/or a non-transitory computer readable recording medium on which a computer program is recorded.

BACKGROUND

A terminal may obtain a video content from a distribution server of video contents and the user of the terminal views and listens to the video content. Also, it has become popular that such a terminal captures an image of a video content being viewed in response to a command of the user, to generate a screenshot, and various methods have been proposed.

Also, along with spread of SNS (Social Network Service), sharing of a generated screenshot with other users has also been practiced.

When viewing video content, if capturing an image of the video content to generate a screenshot to share the generated video content with other users, the user has to suspend viewing the video content while the terminal executes a process of generating and sharing the screenshot.

SUMMARY

In one aspect, a display control method executed by a terminal that includes a display including a screen and at least one processor, includes displaying, using the at least one processor, a first video content on a first area of the screen; generating, using the at least one processor, a screenshot of the first area of the screen in response to accepting a command to capture an image of the video content being played back; and displaying, using the at least one processor, the generated screenshot in a second area in the screen. When the screenshot is displayed in the second area, the video content continues to be played back in the first area.

BRIEF DESCRIPTION OF DRAWINGS

FIGS. 8A-8B are diagrams illustrating an example of a captured image data management table and a screenshot management table according to at least one example embodiment;

FIG. 19 is a diagram illustrating an example of an operation information storing table according to at least one example embodiment;

FIG. 20 is a diagram illustrating an example of a video setting management table according to at least one example embodiment;

DESCRIPTION

According to at least one example embodiment, it is possible for the user to continue viewing a video content while a process of generating and sharing a screenshot is being executed.

First Example Embodiment

<System Configuration>

Figure 1:
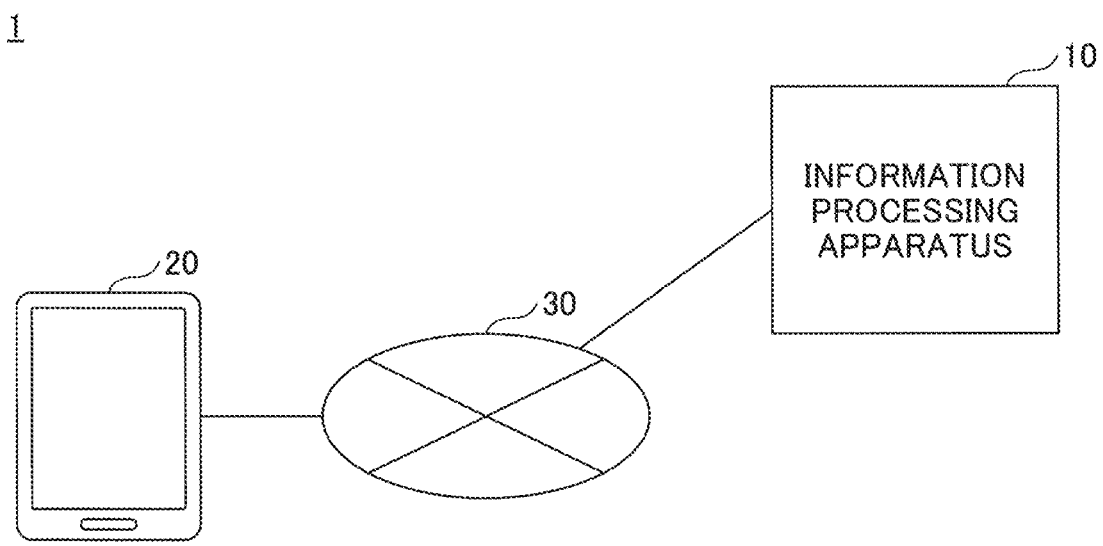
FIG. 1 is a diagram illustrating an example of a system configuration according to at least one example embodiment.

FIG. 1 is a diagram illustrating a system configuration of an information processing system 1 according to the first example embodiment. The information processing system 1 includes an information processing apparatus 10 and a terminal 20, but is not limited thereto. The information processing apparatus 10 and the terminal 20 are connected with each other via a network 30. The network 30 may include a wired network and/or a wireless network.

The information processing apparatus 10 is implemented by, for example, a server, but is not limited thereto. The information processing apparatus 10 distributes a video content to the terminal 20. Also, the information processing apparatus 10 provides an SNS (Social Networking Service) to the user of the terminal 20. Also, the SNS described here may include an instant messenger function. The information processing apparatus 10 provides, as services provided on the SNS, a chat service, a timeline service for displaying a user's event on the SNS, and the like. Note that distribution of a video content and provision of the SNS may be executed by separate information processing apparatuses 10.

The terminal 20 may be a smartphone, a tablet terminal, a PC (Personal Computer), a mobile phone, a game console, a touch pad, an electronic book reader, a wearable terminal, and/or the like. The terminal 20 obtains a video content from the information processing apparatus 10, and plays back the video content on the screen of the terminal 20. For example, the terminal 20 plays back the obtained video content on an application that has a function of playing back the video content.

In response to receiving a command from the user, the terminal 20 captures an image of the video content being played back, to generate a screenshot. Further, in response to receiving a command from the user, the terminal 20 transmits the generated screenshot to the information processing apparatus 10 in order to share it with other users.

<Generation of Screenshot>

Figure 2:
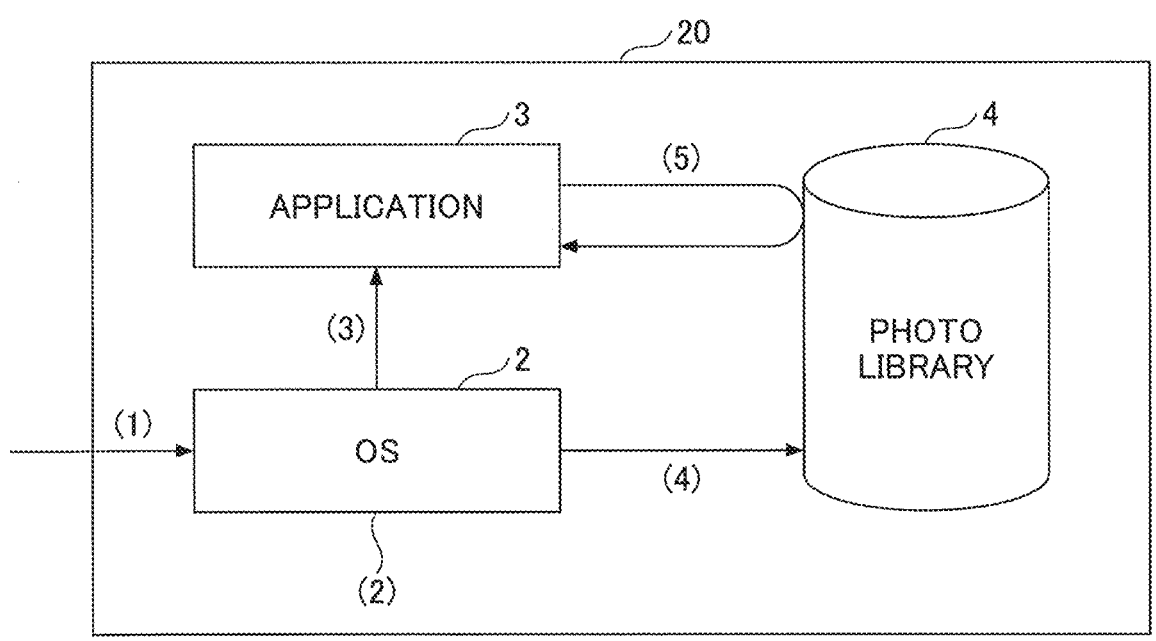
FIG. 2 is a diagram illustrating an example of a procedure of generating a screenshot according to at least one example embodiment.

A procedure of generating a screenshot will be described by using FIG. 2. FIG. 2 illustrates an example of a software configuration of the terminal 20. An OS 2 (Operating System), an application 3 to execute functions related to playback of a video content, SNS, and the like are installed in the terminal 20. A function of receiving and executing a command to generate a screenshot is provided on the OS 2. Also, a photo library is provided as a storage area to store generated screenshots.

A procedure on the terminal 20 that accepts a command to generate a screenshot from the user to generate the screenshot to be displayed on the screen is executed as follows, for example.

In response to accepting a command to generate a screenshot (Operation (1)), the OS 2 captures an image of the screen to generate a screenshot (Operation (2)). The application 3 receives from the OS 2 a notice of generation of the screenshot (Operation (3)). The OS 2 stores the generated screenshot in the photo library 4 (Operation (4)). The application 3 obtains the generated screenshot from the photo library 4, to display it on the screen (Operation (5)).

The application 3 accepts from the user a command related to the screenshot displayed on the screen. For example, the application 3 accepts from the user a command to share the generated screenshot with another user.

The application 3 according to at least one example embodiment interoperates with the OS 2 to display the generated screenshot while playing back the video content. This enables to avoid interrupting the viewing of the video content by the user on the terminal, which would occur conventionally when generating a screenshot.

Figure 3A:
FIGS. 3A-3C are diagrams illustrating examples of a screen of a terminal according to at least one example embodiment.
Figure 3B:
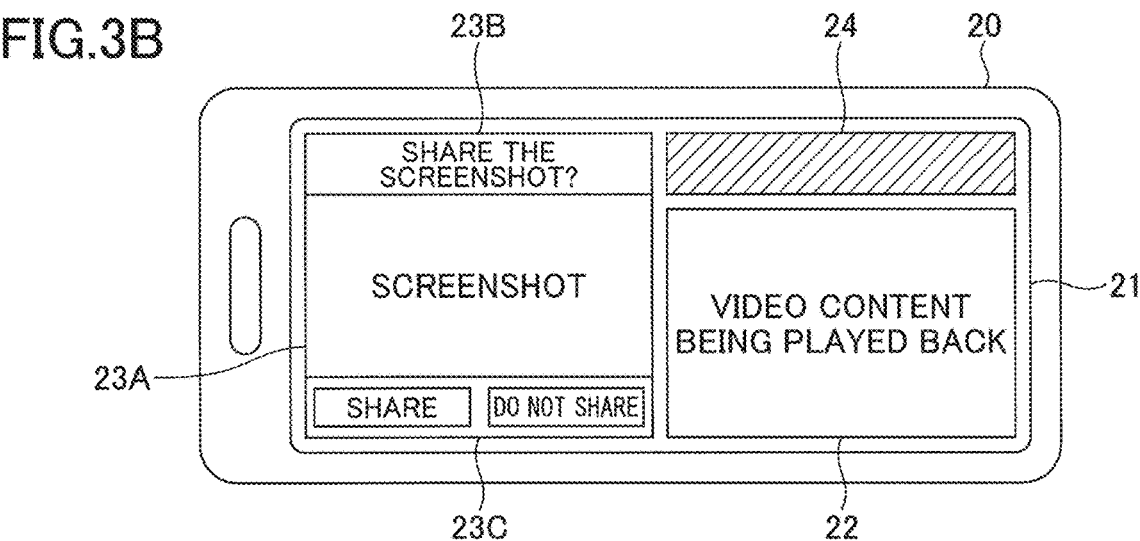

By using FIG. 3, how a screenshot is displayed on the screen will be described according to at least one example embodiment. FIG. 3A illustrates a state in which a video content being played back is displayed on a screen 21 of the terminal 20 according to at least one example embodiment, but the example embodiments are not limited thereto. FIG. 3B illustrates a state in which a generated screenshot is displayed on the screen 21 according to at least one example embodiment, but the example embodiments are not limited thereto. The video content is displayed in a video content display area 22 (referred to as a "first display area", below) on the screen 21. At this time, the playback of the video content continues. The generated screenshot is displayed in a screenshot display area 23 (referred to as a "second display area", below). In the second display area 23, in addition to the screenshot 23A, a message 23B related to a screenshot command ("Share the screenshot?"), and select buttons 23C for issuing a screenshot command ("Share" and "Do not share") are displayed. As illustrated in FIG. 3B, the sizes and positions of the first display area 22 and the second display area 23 in the screen may be adjusted (i.e., display-controlled) so as not to overlap each other.

In addition to the first display area 22 and the second display area 23, an additional information display area 24 (referred to as a "third display area", below) may be provided. In the third display area 24, for example, an advertisement, information on the video content being played back, or various items of information related to the SNS, etc., are displayed.

For example, if accepting the selection of "Share" using the selection button 25C by the user, a menu for setting sharing users is activated and displayed on the screen. Even after the menu for setting sharing users has been activated, the video content is displayed in the first display area 22, to continue playing back the video content.

Figure 3C:
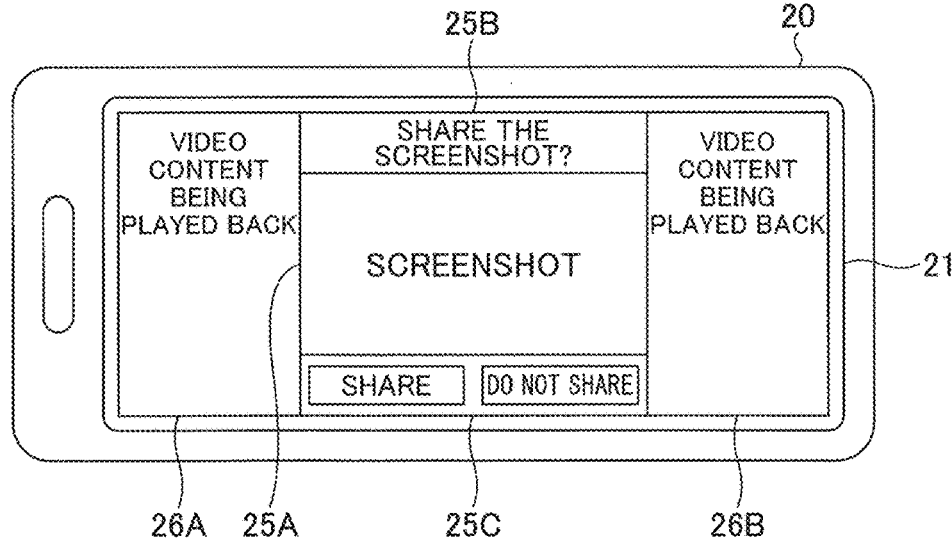

FIG. 3C illustrates a state in which the generated screenshot is displayed according to at least one example embodiment, but the example embodiments are not limited thereto. In FIG. 3C, a second display area 25 is provided at the center of the screen. The second display area 25 is provided to overlap the first display area 26. In the second display area 25, similar to FIG. 3B, in addition to the screenshot 25A, a message 25B related to a screenshot command and selection buttons 25C of a screenshot command are displayed. The video content is displayed in the areas of the first display area 26 (e.g., 26A and 26B) not overlapping the second display area 25, to continue playing back the video content. For example, the left part of the video content being played back is displayed in the area 26A, and the right part of the video content being played back is displayed in the area 26B. In other words, the video content being played back is displayed in areas not overlapping the second display area, but not displayed in the overlapping area.

According to the screenshot generation method according to at least one example embodiment, while the user continues viewing a video content at the terminal 20, it is possible to cause the terminal 20 to execute a process related to generating a screenshot and sharing the screenshot with other users.

<Hardware Configuration>

Next, a hardware configuration of each device included in the information processing system 1 will be described.

(1) Information Processing Apparatus

Figure 4:
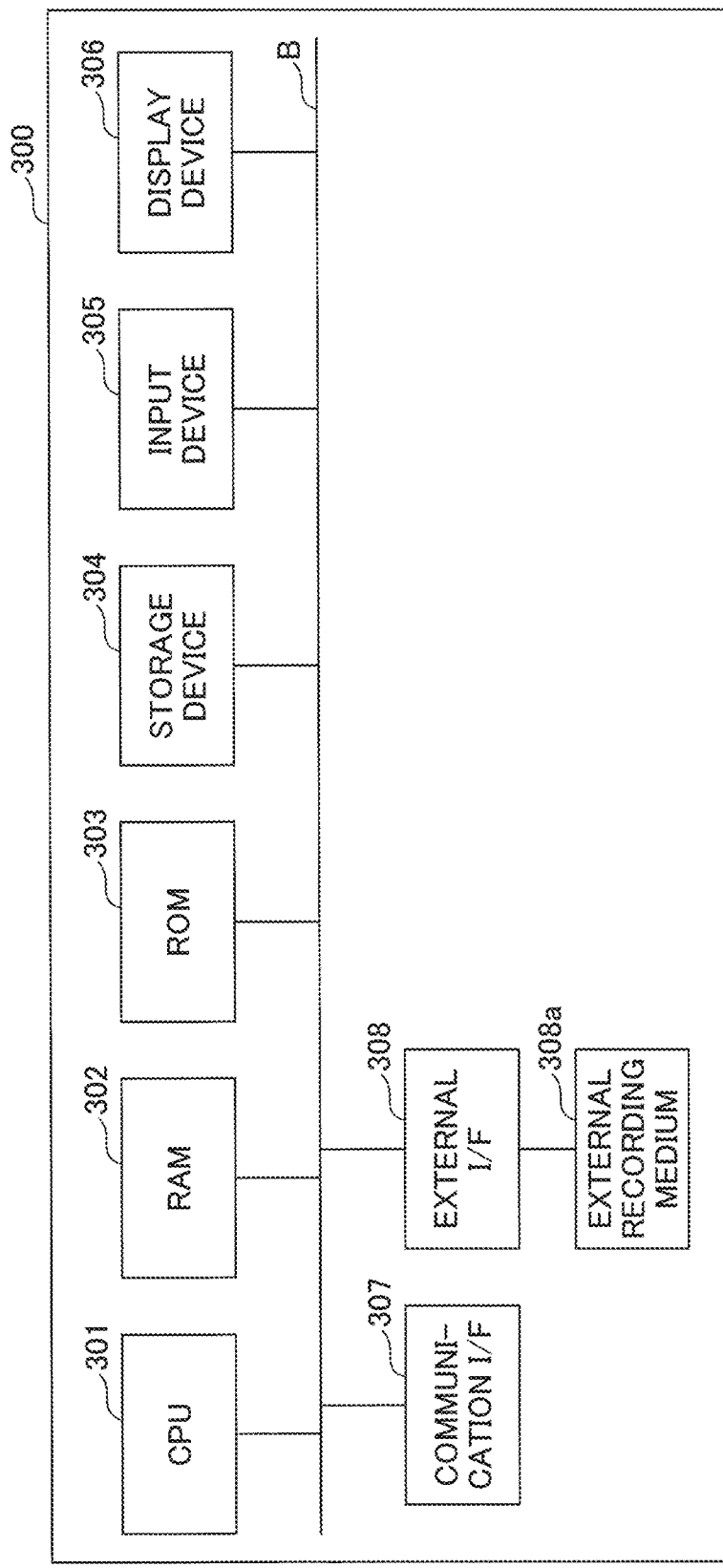
FIG. 4 is a diagram illustrating an example of a hardware configuration of a computer according to the first embodiment in the present disclosure.

The information processing apparatus 10 has a general computer configuration. FIG. 4 is a diagram illustrating an example of a hardware configuration of a computer according to at least one example embodiment, but the example embodiments are not limited thereto. In FIG. 4, a computer 300 includes, for example, at least one CPU (Central Processing Unit) 301, a RAM (Random Access Memory) 302, a ROM (Read-Only Memory) 303, a storage device 304, an input device 305, a display device 306, a communication I/F (Interface) 307, and/or an external I/F 308, etc., and these hardware components are connected with each other via a bus B.

The at least one CPU 301 is an arithmetic device that realizes control and functions of the computer 300 by reading programs and data from a memory such as the ROM 303 and the storage device 304 onto the RAM 302 and executing processes. The ROM 303 stores programs and data such as BIOS (Basic Input/Output System) that is executed when the computer 300 is activated, settings of an OS (Operating System), various settings, and the like. The RAM 302 is a volatile memory to temporarily hold programs and data. The storage device 304 is a large-capacity storage device to store programs and data.

The input device 305 is, for example, a keyboard, a mouse, and the like, and is used by the user to input various operation signals. The display device 306 is, for example, a display or the like, to display a processing result by the computer 300. Note that the input device 305 and/or the display device 306 may be configured to be connected and used when necessary.

The communication I/F 307 is an interface for connecting the computer 300 to the network 30. The external I/F 308 is an interface with an external device. The external device includes an external storage medium 308a and the like. Thereby, the computer 300 can execute reading and/or writing on the external recording medium 308a through the external I/F 308. The external recording medium 308a may include various types of optical disks, various types of memory cards, and the like.

The at least one CPU 301 running programs stored in the ROM 303 or the like enables to implement the functions of the information processing apparatus 10.

(2) Terminal

Figure 5:
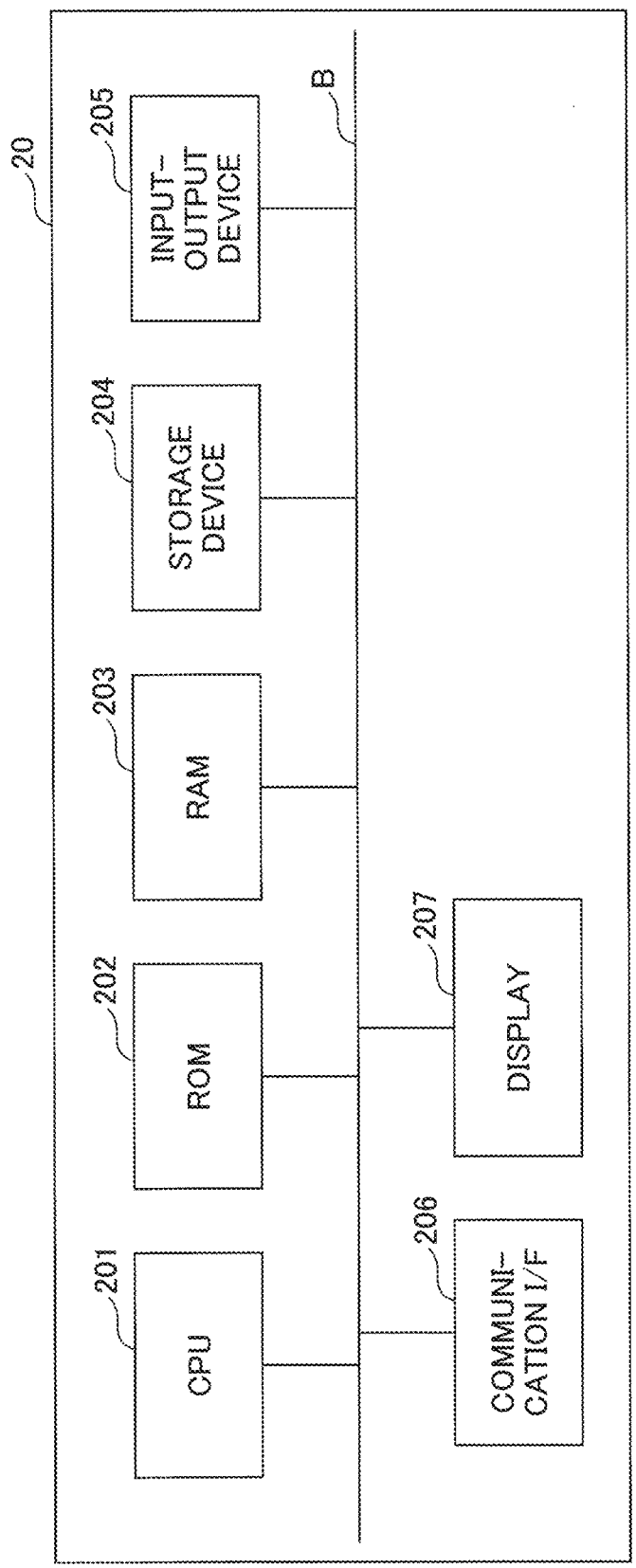
FIG. 5 is a diagram illustrating an example of a hardware configuration of a terminal according to at least one example embodiment.

FIG. 5 is a diagram illustrating an example of a hardware configuration of the terminal 20 in at least one example embodiment, but is not limited thereto.

The terminal 20 includes at least one CPU 201, a ROM 202, a RAM 203, a storage device 204, an input/output device 205, a communication I/F 206, and/or a display 207 (a display device), etc. Note that the components of the hardware of the terminal 20 are connected with each other through a bus B.

The storage device 204 stores various programs. The at least one CPU 201 is a computer that executes various programs stored in the storage device 204.

The ROM 202 is a nonvolatile memory. The ROM 202 stores various programs, data, and the like necessary for the at least one CPU 201 to run various programs stored in the storage device 204.

The RAM 203 functions as a work area developed when various programs are executed by the at least one CPU 201.

The input/output device 205 includes a function of an input device to input various commands into the terminal 20, and a function of an output device to output a processed result processed by the terminal 20. The input/output device 205 is connected to the display 207. In at least one example embodiment, the display 207 may be a touch-sensitive display (a touch panel). The communication I/F 206 executes communication between the terminal 20 and the information processing apparatus 10 through the network 30.

The at least one CPU 201 running programs stored in the storage device 204 or the like enables to implement the functions of the terminal 20.

<Functional Configuration>

(1) Functional Configuration of Information Processing Apparatus

Figure 6:
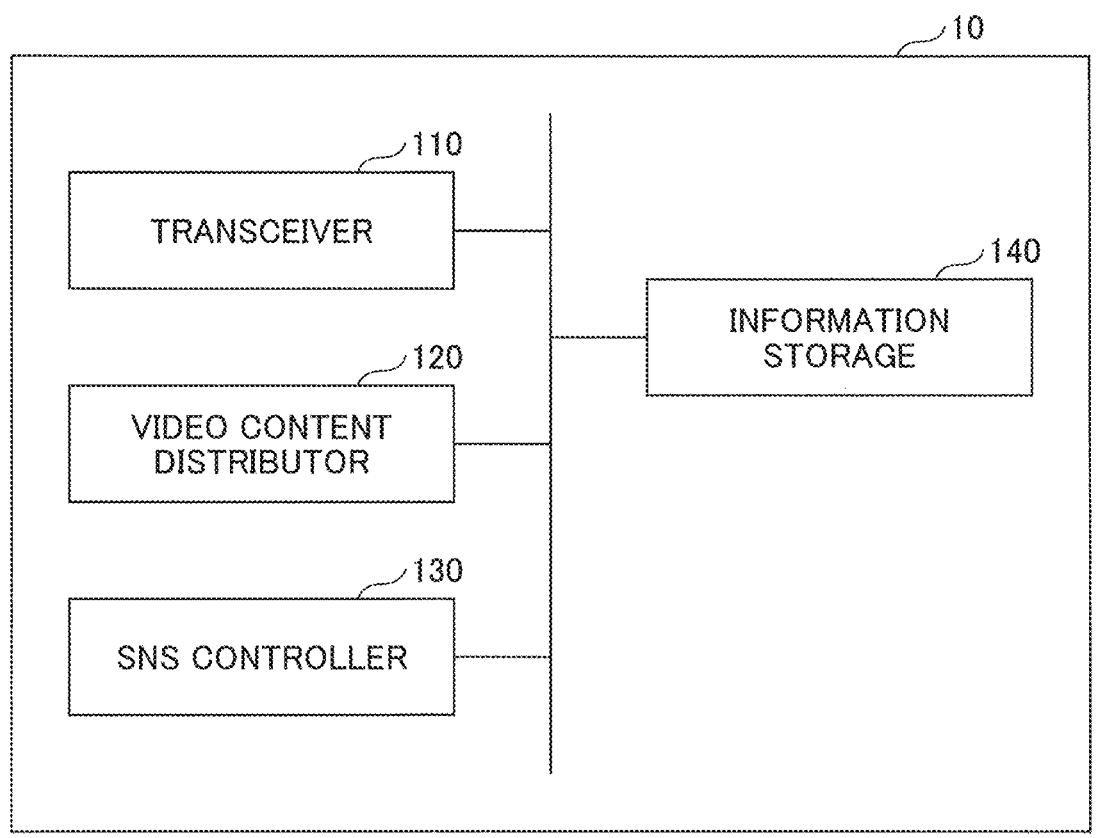
FIG. 6 is a diagram illustrating an example of a functional configuration of an information processing apparatus according to at least one example embodiment.

By using FIG. 6, the functional configuration of the information processing apparatus 10 according to at least one example embodiment will be described. The information processing apparatus 10 includes a transceiver 110, a video content distributor 120, and/or an SNS controller 130, etc. These functions are implemented by causing the at least one CPU 301 (and/or other processors or other processing devices, etc.) to process one or more programs installed in the information processing apparatus 10 to function as the transceiver 110, video content distributor 120, and/or SNS controller 130, etc.

The information processing apparatus 10 also includes an information storage 140 (e.g., information storage device). The information storage 140 can be implemented, for example, by the storage device 304.

The transceiver 110 transmits and receives data with the terminal 20.

In response to a request for distributing a video content from the terminal 20, the video content distributor 120 distributes the video content requested for distribution by the terminal 20 to the terminal 20. The video content distributor 120 obtains a video content from the information storage 140, and distributes the obtained video content to the terminal 20.

The SNS controller 130 executes control for providing an SNS to the user of the terminal 20. The SNS controller 130 receives a content from the terminal 20 and transmits the content to a terminal 20 of an addressed user. Here, a content is a message, a still image, a video, a stamp, etc., or a combination of these.

The information storage 140 stores video contents to be distributed to the terminals 20 and various items of information on the users of the SNS.

(2) Functional Configuration of Terminal

Figure 7:
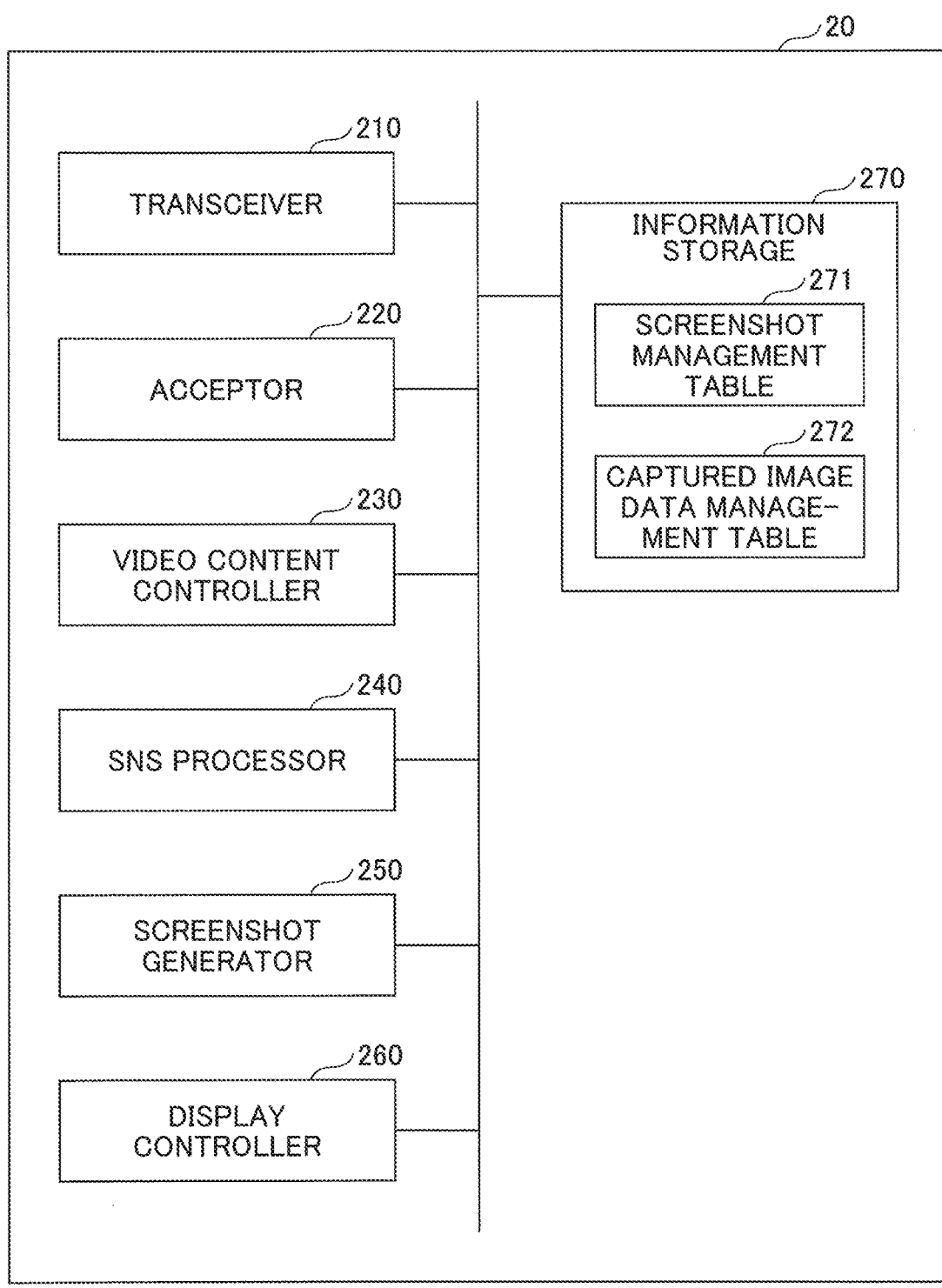
FIG. 7 is a diagram illustrating an example of a functional configuration of a terminal according to at least one example embodiment.

Next, by using FIG. 7, a functional configuration of the terminal 20 will be described. The terminal 20 includes a transceiver 210, an acceptor 220, a video content controller 230, an SNS processor 240, a screenshot generator 250, and/or a display controller 260, etc. These functions are implemented by causing the at least one CPU 201 (and/or other processors or other processing devices, etc.) to process one or more programs installed in the terminal 20 to function as the transceiver 210, acceptor 220, video content controller 230, SNS processor 240, screenshot generator 250, and/or display controller 260, etc. The terminal 20 also includes an information storage 270 (e.g., information storage device). The information storage 270 includes a screenshot management table 271 and a captured image data management table 272. The information storage 270 is implemented, for example, by the storage device 204.

The transceiver 210 transmits and receives data with the information processing apparatus 10.

The acceptor 220 accepts a command from the user of the terminal 20. The acceptor 220 accepts from the user a command to distribute a video content, a command to generate a screenshot, and a command to transmit/receive a content on the SNS.

The video content controller 230 plays back a video content distributed from the information processing apparatus 10.

When the acceptor 220 receives a command from the user, the screenshot generator 250 captures an image of a video content displayed on the screen at the timing when the command was received from the user, to generate a screenshot of the video content. The screenshot generator 250 associates the generated screenshot with the time when the screenshot was generated, and stores it in the captured image data management table 272, which is a table provided for managing data such as photos and videos. The screenshot generator 250 transmits a notice of an event of generating a screenshot to the SNS processor 240.

The SNS processor 240 executes a process related to the SNS of the user of the terminal 20. The SNS processor 240 executes a process for sharing a generated screenshot with other users or the like participating in the SNS. Specifically, the SNS processor 240 issues a command to the information processing apparatus 10 to distribute a screenshot to the terminals 20 of other users and places on the SNS, which have been set as sharing users.

The SNS processor 240 obtains the generated screenshot from the captured image data management table 272 and stores it in the screenshot management table 271 that manages screenshots of video contents. At this time, the SNS processor 240 receives a notice of an event of generating the screenshot from the screenshot generator 250, and the SNS processor 240 stores the time when the notice was received. The SNS processor 240 may identify the screenshot generated based on the stored time.

Also, from the generated time of the screenshot stored in the captured image data management table 272 and the playback time of the video content being played back, the SNS processor 240 identifies a corresponding position of the generated screenshot on the video content being played back. Here, the corresponding "position" on the content is a time position on the video content being played back (simply referred to as the "position," below).

Then, the SNS processor 240 stores the identified position in the screenshot management table 271 in association with the screenshot. For example, if the generation time of the screenshot is 18:05:10 on Mar. 28, 2016, and the playback start time of the video content is 18:00 on Mar. 18, 2016, the SNS processor 240 identifies the position of the generated screen shot corresponding to the video content being played back as the position at 5 minutes and 10 seconds from the start of the playback. The SNS processor 240 may also store in the screenshot management table 271 an identifier of the video content corresponding to the screenshot, a URL representing a location on the network for accessing the video content, and the like.

The SNS processor 240 may execute a process on the generated screenshot based on the sharing users of the screenshot set (e.g., set in advance) by the user.

For example, if a chat group (talk room) has been set (e.g., set in advance, etc.) on the SNS as sharing users of a screenshot, the SNS processor 240 transmits the screenshot to the information processing apparatus 10 and issues a command to the information processing apparatus 10 to post the screenshot to the chat group.

For example, if a timeline of the user of the terminal 20 is set as sharing users of the screenshot, the SNS processor 240 transmits the screenshot to the information processing apparatus 10 and issues a command to the information processing apparatus 10 to post the screenshot to the timeline.

For example, if another user is set as a sharing user of the screenshot, the SNS processor 240 transmits the screenshot to the information processing apparatus 10 and issues a command to the information processing apparatus 10 to transmit the screenshot to the other user.

The display controller 260 displays video contents, generated screenshots, information on the SNS, and the like on the screen. The display controller 260 sets a display area (e.g., first display area) in the screen displaying a video content and a display area (e.g., second display area) in the screen displaying a screenshot. The display controller 260 may set the entire screen as the first display area, etc. Then, at the timing when displaying a generated screenshot, the display controller 260 sets the display area of the screenshot (e.g., second display area) in addition to the first display area, and displays the video content and the screenshot in the respective display areas on the screen. Setting the first display area and the second display area enables to continue playing back a video content while displaying a screenshot and executing various processes on the screenshot.

The information storage 270 stores an OS, applications, and various other data items. The captured image data management table 272 stores each screenshot generated by the screenshot generator 250 in association with the time when the screenshot was generated. In addition to the screenshot, the captured image data management table 272 may store data such as photos and videos captured on the terminal 20. FIG. 8A illustrates an example of the captured image data management table 272 according to at least one example embodiment.

The screenshot management table 271 stores a captured screenshot of a video content in association with the identifier of the video content, based on a command from the SNS processor 240. FIG. 8B illustrates an example of the screenshot management table 271. The screenshot management table 271 in FIG. 8B stores a screenshot in association with, for example, "date and time of generation", "video content identifier" to uniquely identify a video content, "position" of the screenshot in the video content, and "URL of the video content", etc. Note that the date and time of generation may be set with the date and time when receiving a notice of the screenshot generation event.

Each of the functions is deployed in either the OS and/or an application of the terminal 20, and the functions interoperate with each other to execute a process. For example, the screenshot generator 250 may be deployed as a function of the OS, and may be deployed as the video content controller 230, the SNS processor 240, and/or the display controller 260, etc., but is not limited thereto. In this case, when the acceptor 220 receives a command to generate a screenshot from the user, the OS operates and executes the function of the screenshot generator 250. Then, the functions deployed in the application obtain the screenshot generated by the OS, to execute various types of control on the screenshot. At this time, the functions deployed in the application continue respective processes such as playing back a video content.

<Operations>

(1) Operating Sequence

Figure 9:
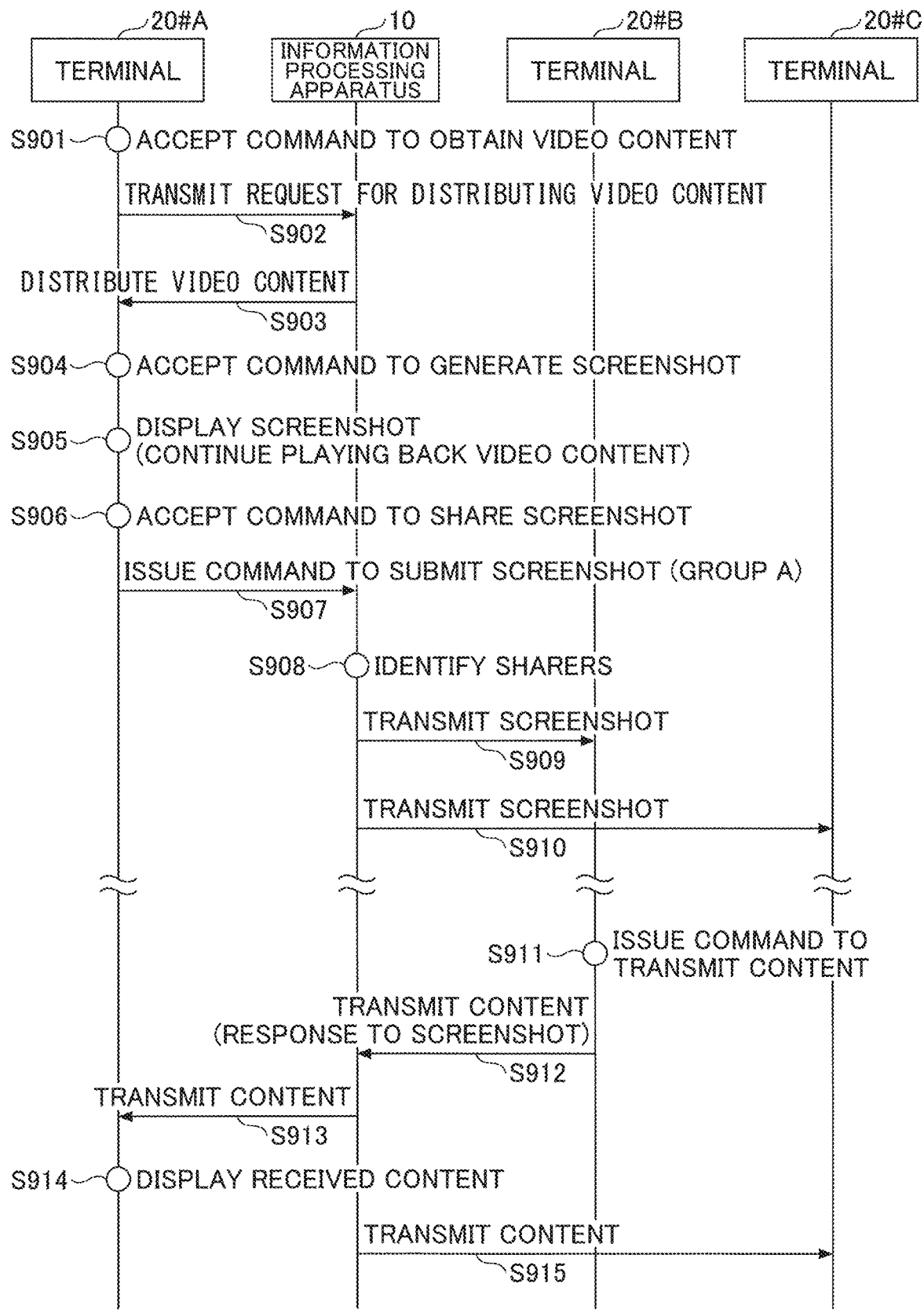
FIG. 9 is a diagram illustrating a first example of an operating sequence according to at least one example embodiment.

By using FIG. 9, an operating sequence according to at least one example embodiment will be described, but the example embodiments are not limited thereto. Here, assume that a user A uses a terminal 20 #A, a user B uses a terminal 20 #B, and a user C uses a terminal 20 #C, etc. Also assume that the user A, the user B, and the user C belong to a group A.

At Operation S901, the terminal 20 #A receives a command to obtain a video content from the user A.

At Operation S902, the terminal 20 #A transmits a request for distributing the video content to the information processing apparatus 10.

At Operation S903, in response to the request for distributing the video content, the information processing apparatus 10 distributes the video content to the terminal 20 #A. The video content is played back in the first display area of the screen of the terminal 20. Note that if the video content is displayed on the full screen, the first display area corresponds to the entire screen.

At Operation S904, the terminal 20 #A accepts, from the user A, a command to generate a screenshot of the video content displayed on the screen. In response to the command, the terminal 20 #A generates a screenshot.

At Operation S905, the terminal 20 #A sets a second display area in addition to the first display area on the screen, to display the generated screenshot. At this time, playback of the video content continues in the first display area.

At Operation S906, the terminal 20 #A accepts a command related to sharing of the screenshot. Here, assume that the terminal 20 #A has accepted a command from the user A to post the generated screenshot to the group A.

At Operation S907, the terminal 20 #A transmits the screenshot to the information processing apparatus 10 and issues a command to the information processing apparatus 10 to post the screenshot to the group A.

At Operation S908, upon receiving the command from the terminal 20 #A, the information processing apparatus 10 identifies that users other than the user A belonging to the group A are the user B and the user C, and identifies the terminals 20 (20 #B and 20 #C) of the user B and the user C.

At Operation S909, the information processing apparatus 10 transmits the screenshot to the terminal 20 #B.

At Operation S910, the information processing apparatus 10 transmits the screenshot to the terminal 20 #C.

Next, an operating sequence will be described in the case of receiving a response from another user who has received a screenshot. Here, assume that a content is to be transmitted from the terminal 20 #B of the user B, as a response to a screenshot.

At Operation S911, the user of the terminal 20 #B issues a command to the terminal 20 #B to transmit a content such as a message and a stamp as a response to the screenshot.

At Operation S912, the terminal 20 #B transmits the content to the group A as a response to the screenshot. Note that the content includes an indication of the response to the screenshot.

At Operation S913, upon receiving the content, the information processing apparatus 10 transmits the received content to the terminal 20 #A of the user A.

At Operation S914, the terminal 20 #A displays the received content. Here, the terminal 20 #A may display the received content in the first display area where the video is being played back. This enables the user A to recognize the content as the response to the transmitted screenshot. The terminal 20 #A may display the received content in the third display area.

At Operation S915, upon receiving the content, the information processing apparatus 10 transmits the received content to the terminal 20 #C of the user C.

In the example embodiment described above, although a case has been described in which a content from the user who has received the screenshot is displayed, substantially the same display control can of course be applied to a response to a distributed screenshot. For example, when posting a screenshot to a timeline, if receiving a comment on the timeline from another user, the comment may be displayed on the terminal 20 #A by using substantially the same display control method.

(2) Operation Flow

Figure 10:
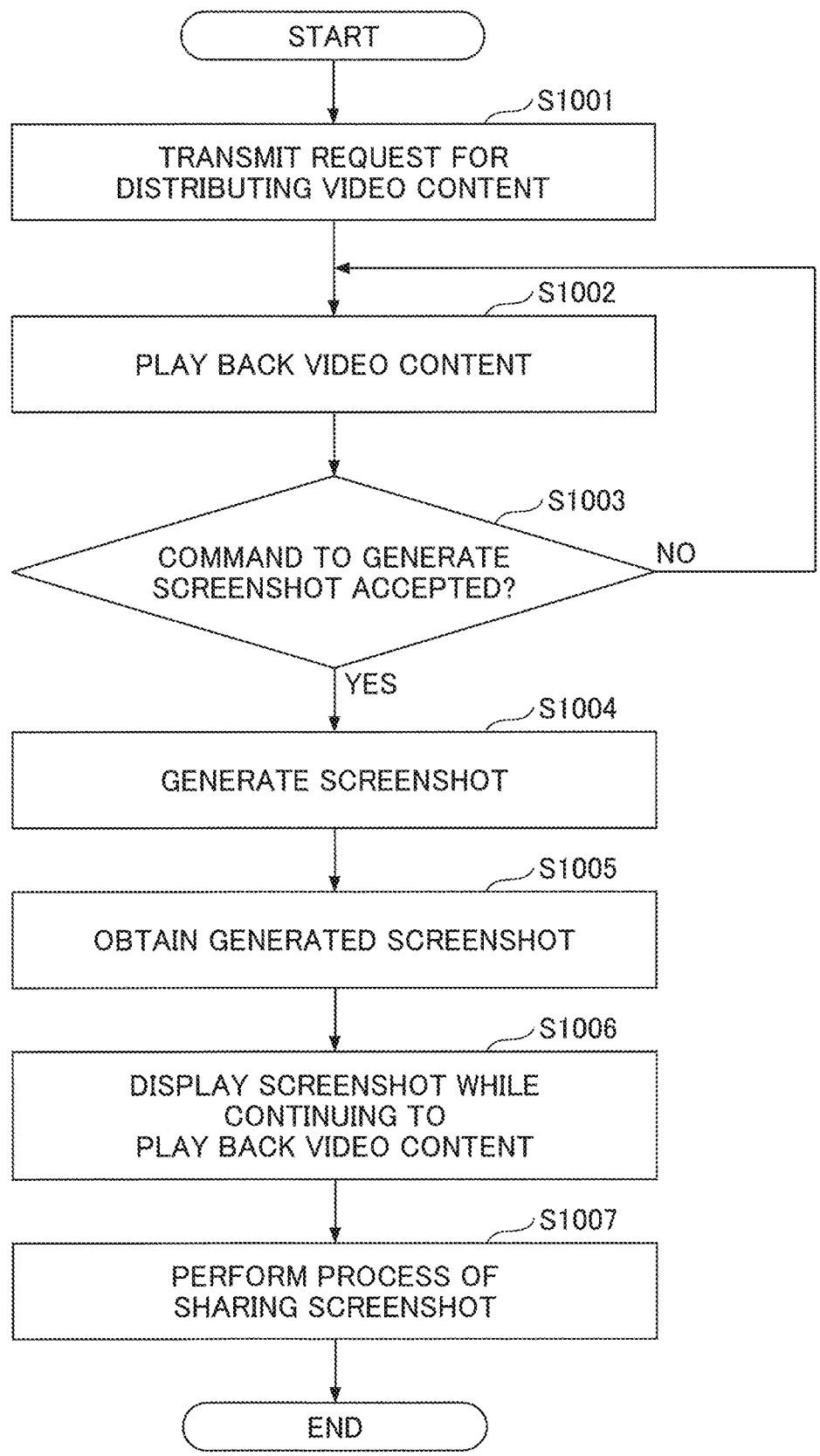
FIG. 10 is a diagram illustrating an example of an operation flow according to at least one example embodiment.

Next, by using FIG. 10, an operation flow of the terminal 20 according to at least one example embodiment will be described.

At Operation S1001, the video content controller 230 transmits a request for distributing a video content to the information processing apparatus 10.

At Operation S1002, having obtained the video content from the information processing apparatus 10, the video content controller 230 issues a command to the display controller 260 to display the video content. In response to receiving the command, the display controller 260 displays the video content on the screen. The video content controller 230 plays back the obtained video content in the first display area of the screen.

At Operation S1003, the screenshot generator 250 determines whether or not the acceptor 220 has accepted a command to generate a screenshot from the user. If having accepted a command to generate a screenshot (YES at Operation S1003), the process proceeds to Operation S1004. On the other hand, if not having accepted a command to generate a screenshot, the process returns to Operation S1002.

At Operation S1004, the screenshot generator 250 captures an image of the video content displayed on the screen, to generates a screenshot. The screenshot generator 250 stores the generated screenshot in the captured image data management table 272.

At Operation S1005, in response to receiving a notice related to generation of the screenshot from the screenshot generator 250, the SNS processor 240 obtains the generated screenshot from the captured image data management table 272.

At Operation S1006, the screenshot generator 250 issues a command to the display controller 260 to display the screenshot. In order to display the screenshot on the screen, the display controller 260 sets a second display area on the screen in addition to the first display area. Then, the display controller 260 displays the generated screenshot in the second display area while continuing the playback of the video content in the first display area. Also, the screenshot generator 250 identifies the position of the screenshot in the video content and stores the position in the screenshot management table 271 along with the screenshot.

At Operation S1007, in response to an acceptance of a command by the acceptor 220 from the user to share the screenshot, the SNS processor 240 executes a process of sharing the screenshot. Specifically, the SNS processor 240 transmits the screenshot to the information processing apparatus 10 and issues a command to the information processing apparatus 10 to transmit the screenshot to designated sharing users.

Here, the command to share from the user may include sharing users of the screenshot, or in the case where the sharing users have been set in advance, sharing users may not be included. By setting the sharing users in advance, it is possible to shorten the time required for sharing the screenshot.

Note that in the one or more example embodiments described above, although a case has been described in which a video content is obtained from the information processing apparatus 10, substantially the same process can of course be applied even in a case in which a video content stored in the terminal 20 is displayed on the screen.

Modified Example

Figure 11:
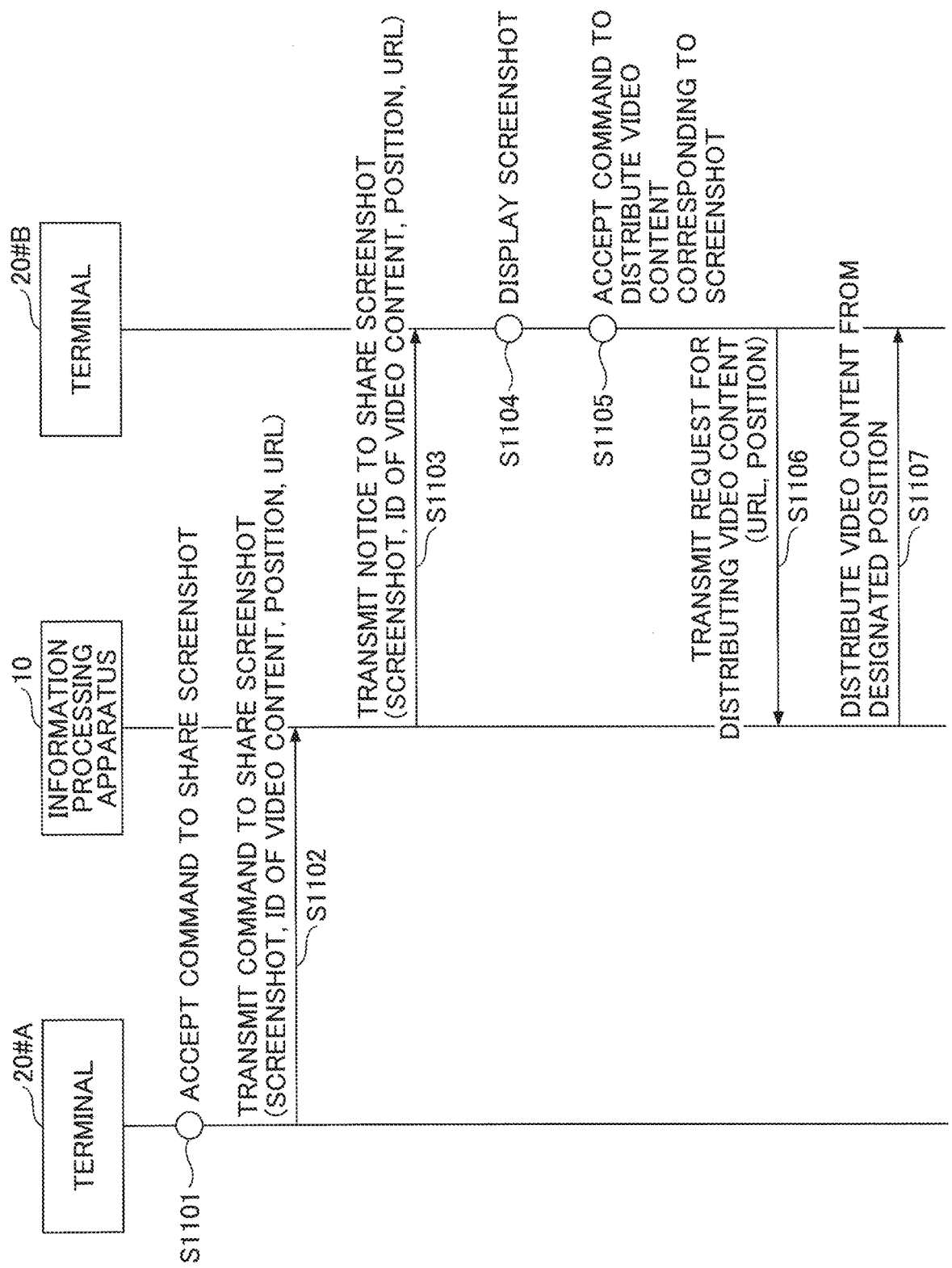
FIG. 11 is a diagram illustrating a second example of an operating sequence according to at least one example embodiment.

Next, a modified example according to the first example embodiment will be described. In the modified example, in addition to sharing a screenshot, information identifying the position and the like of a generated screenshot in a video content is shared so as to make it easier for another user who shares the screenshot or the like to view the video content starting from the position where the screenshot has been generated. By using FIG. 11, an operation flow according to the modified example will be described. Assume that the user A uses the terminal 20 #A and the user B uses the terminal 20 #B. At this time, assume that the information illustrated in FIG. 8B is stored in the screenshot management table 271 of the terminal 20 #A.

At Operation S1101, the terminal 20 #A accepts a command from the user A to share a screenshot (e.g., CCC.jpg) with the user B.

At Operation S1102, the terminal 20 #A transmits a command to the information processing apparatus 10 to share the screenshot with the user B. The command to share includes a screenshot (e.g., CCC.jpg), a video content identifier (#123), a position of the screenshot (06:15), and a video content URL.

At Operation S1103, in response to the command, the information processing apparatus 10 transmits a notice of sharing of the screenshot to the terminal 20 #B of the user B. The notice of sharing includes the screenshot (e.g., CCC.jpg), the video content identifier (#123), the position of the screenshot (06:15), and the video content URL.

At Operation S1104, the terminal 20 #B displays the received screenshot (e.g., CCC.jpg) on the screen.

At Operation S1105, the terminal 20 #B receives a request for delivering the video content corresponding to the screenshot (e.g., CCC.jpg) from the user B.

At Operation S1106, the terminal 20 #B transmits the request for distributing the video content to the information processing apparatus 10. The request for distributing the video content includes the URL of the video content and the position of the screenshot received by the terminal 20 #B at Operation S1103.

At Operation S1107, in response to the request for distributing the video content, the information processing apparatus 10 starts distributing the video content. Here, the information processing apparatus 10 plays back the video content identified by the designated URL, starting from the position corresponding to the screenshot.

As such, the other users sharing the screenshot can easily view the video content corresponding to the screenshot.

Note that in the operations described above, although the video content is distributed from the position corresponding to the screenshot, the video content may be distributed starting from a position at a desired and/or predetermined time before the position corresponding to the screenshot. This is because the position at which the screenshot was generated is highly likely to be a highlight scene of the video content; therefore, by allowing a user who now shares the screenshot to view it from a desired and/or predetermined time before (for example, two to three minutes before), it is possible for the user to better understand the story of the video content.

For example, at Operation S1102, the terminal 20 #A may indicate the information processing apparatus 10 of the position at a desired and/or predetermined time before the screenshot. In this case, the desired and/or predetermined time may be adjusted by a command from the user A. Also, the information processing apparatus 10 may determine at Operation S1103 the position at a desired and/or predetermined time before the screenshot, to indicate the position to the terminal 20 #B.

Second Example Embodiment

Next, a second example embodiment will be described. Description will be omitted for parts common to the first example embodiment, and only different parts will be described. In the second example embodiment, interoperation between the OS and an application running on the terminal 20 will be described. Specifically, assuming that the screenshot generator 250 is implemented as a function of the OS, and the SNS processor 240 and the like are implemented as functions of the application, interoperation between the screenshot generator 250 as a function of the OS and the SNS processor 240 as a function of the application will be described.

In the case of executing an application by using the functions deployed in the OS, the function deployed in the application needs to operate according to an API (Application Program Interface), which is an interface between the OS and the application. In the case where the function of generating a screenshot is deployed in the OS, the application can receive a notice indicating that a processing event related to the screenshot has occurred in the OS via the API; however, the application cannot control the start timing of the screenshot process. For this reason, it is a feature of the application according to the second example embodiment to identify a screenshot corresponding to a screen of a video content after receiving a notice indicating that an event has occurred, to use it for processing in the application.

<Functional Configuration>

A terminal 20 according to the second example embodiment has substantially the same functional configuration as the terminal 20 in the first example embodiment. The screenshot generator 250 is implemented as a function of the OS installed in the terminal 20. The video content controller 230, the SNS processor 240, and the display controller 260 are implemented as functions of the application related to the SNS, video distribution, and the like.

The screenshot generator 250 generates a screenshot of a video content being played on the screen when the acceptor 220 has received a command to generate a screenshot. Also, the screenshot generator 250 issues a notice of the screenshot generation event to the SNS processor 240 via the API. The screenshot generator 250 stores the generated screenshot in the captured image data management table 272. Note that the captured image data management table 272 may be referred to as a photo library.

In response to receiving a notice of the screenshot generation event, the SNS processor 240 starts monitoring image data in the captured image data management table 272 where screenshots are stored. Upon detecting that new image data is stored in the captured image data management table 272, the SNS processor 240 determines that the new image data corresponds to the generated screenshot and obtains the data from the management table 272.

<Operating Sequence>

Figure 12:
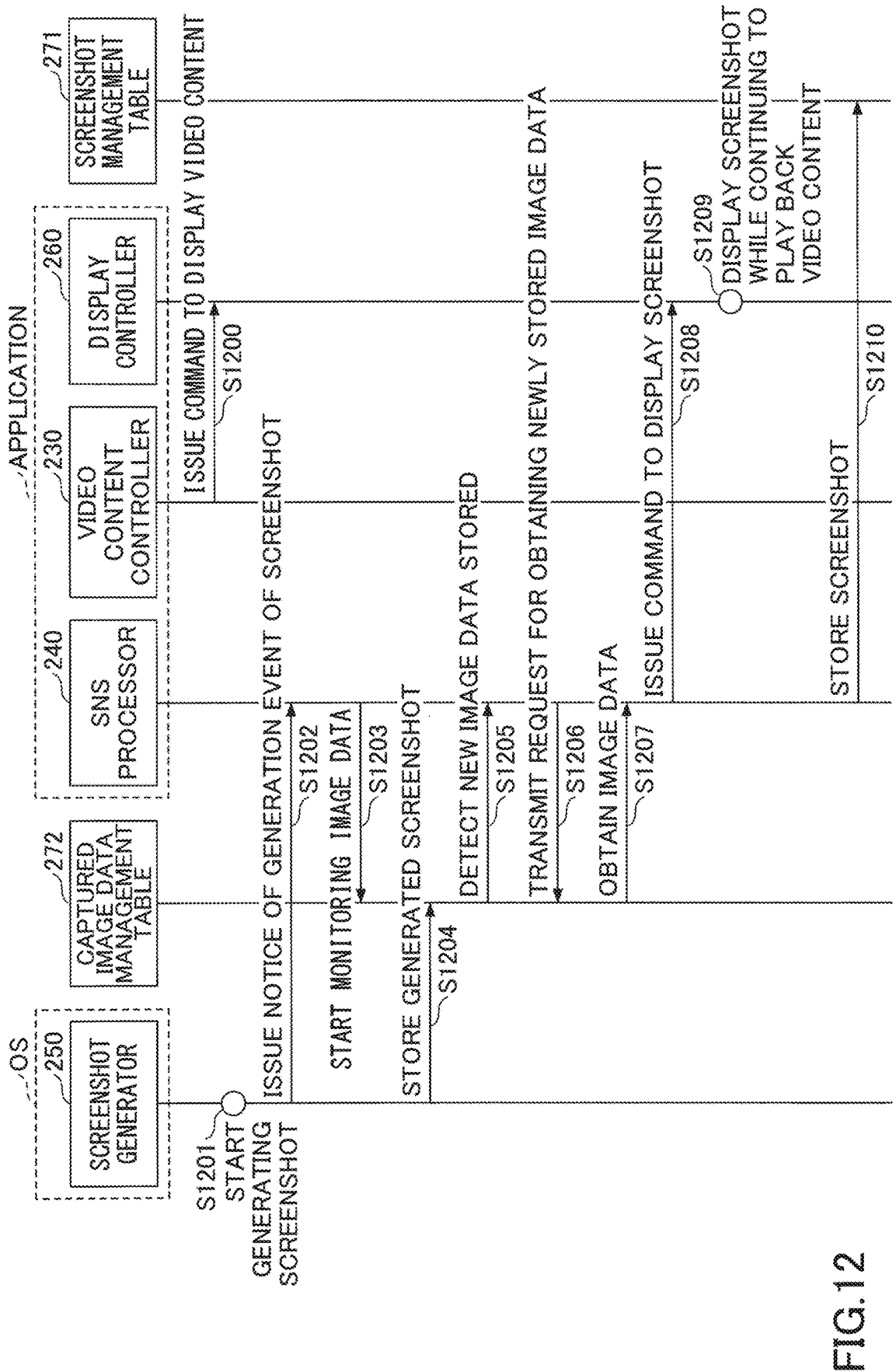
FIG. 12 is a diagram illustrating a first example of an operating sequence according to at least one example embodiment.

Next, by using FIG. 12, an operating sequence between the functional blocks of the terminal 20 will be described according to the second example embodiment.

At Operation S1200, the video content controller 230 issues a command to the display controller 260 to display a video content received from the information processing apparatus 10 on the screen. In response to receiving the command, the display controller 260 displays the video content on the screen. As a result, the terminal 20 transitions to a state in which the video content is being played back on the screen.

At Operation S1201, when the acceptor 220 receives a command to generate a screenshot from the user, the screenshot generator 250 starts a process of generating the screenshot.

At Operation S1202, the screenshot generator 250 issues a notice of a screenshot generation event to the SNS processor 240 via the API.

At Operation S1203, the SNS processor 240 starts monitoring the image data stored in the captured image data management table 272. Specifically, the SNS processor 240 monitors whether new image data is stored in the captured image data management table 272.

At Operation S1204, the screenshot generator 250 stores the generated screenshot in the captured image data management table 272.

At Operation S1205, the SNS processor 240 detects that new image data has been stored in the captured image data management table 272.

At Operation S1206, the SNS processor 240 determines that the newly stored image data corresponds to the generated screenshot, and transmits a request for obtaining the newly stored image data to the captured image data management table 272.

At Operation S1207, the SNS processor 240 obtains the image data from the captured image data management table 272.

At Operation S1208, the SNS processor 240 issues a command to the display controller 260 to display the obtained image data as the screenshot of the video content being played back on the screen.

At Operation S1209, the display controller 260 sets a first display area and a second display area on the screen, and displays the screenshot in the second display area while playing back the video content in the first display area.

At Operation S1210, the SNS processor 240 stores the obtained image data in the screenshot management table 271 as the generated screenshot. At this time, the image data may be stored in association with the date and time of generation, the identifier of the video content being played back, the position, the URL of the video content, and the like.

According to the operations described above, when receiving a notice of generation of a screenshot from the screenshot generator 250 as a function of the OS by using the existing API framework, the SNS processor 240 as a function of the application can obtain an appropriate screenshot to use it for an application process.

Note that in the example embodiment described above, although the SNS processor 240 determines that the image data newly stored in the captured image data management table 272 corresponds to the generated screenshot, the SNS processor 240 may identify the screenshot corresponding to the generation event based on the time when the notice of the screenshot generation event was received. For example, the SNS processor 240 may determine the image data generated at a time after the time when the notice of the event was received, and closest to the time when the notice was received, as the image data corresponding to the screenshot. Also, in the example embodiment described above, although a case has been described as an example in which an event related to generation of a screenshot is indicated via the API between the screenshot generator 250 and the SNS processor 240, functional blocks of the sender and the receiver of the event are not limited in particular. A function block deployed in the application via the API that monitors the captured image data management table 272 (e.g., a photo library) in response to receiving an event related to generation of a screenshot can of course implement substantially the same process.

Modified Example

A modified example of the second example embodiment will be described. The modified example has a feature in which the display on the screen is changed when a screenshot is generated. By using FIG. 13, an operating sequence will be described according to the modified example of the second example embodiment.

Since the process from Operation S1300 to Operation S1302 is the same as the process from Operation S1200 to Operation S1202, the description will be omitted.

At Operation S1303, the SNS processor 240 issues a command to display a video content in a display mode for generating a screenshot. Here, the "display mode for generating a screenshot" is a mode, for example, in which icons for operating a video content being played back normally displayed along with the video content, information such as an advertisement, and the like are not displayed, so as not to display information other than the video content on the screen as much as possible. The display mode for generating a screenshot is also, for example, to display a video content in full screen display.

At Operation S1304, the display controller 260 displays the video content on the screen in the display mode for generating a screenshot. For example, if icons for operation, advertisement information, and the like are displayed, the display controller 260 executes a process of not displaying these information items. Also, for example, if the video content is not displayed in full screen display, the display controller 260 executes a process of displaying the video content in full screen display.

At Operation S1305, the display controller 260 issues a notice to the SNS processor 240 that the display mode of the video content has been changed into the mode for generating a screenshot.

At Operation S1306, the SNS processor 240 issues a command to the screenshot generator 250 to generate a screenshot via the API.

At Operation S1307, the screenshot generator 250 issues a notice of a screenshot generation event to the SNS processor 240 via the API.

Since the subsequent process is the same as the process from Operation S1203 to Operation S1210, the description will be omitted.

Figure 13:
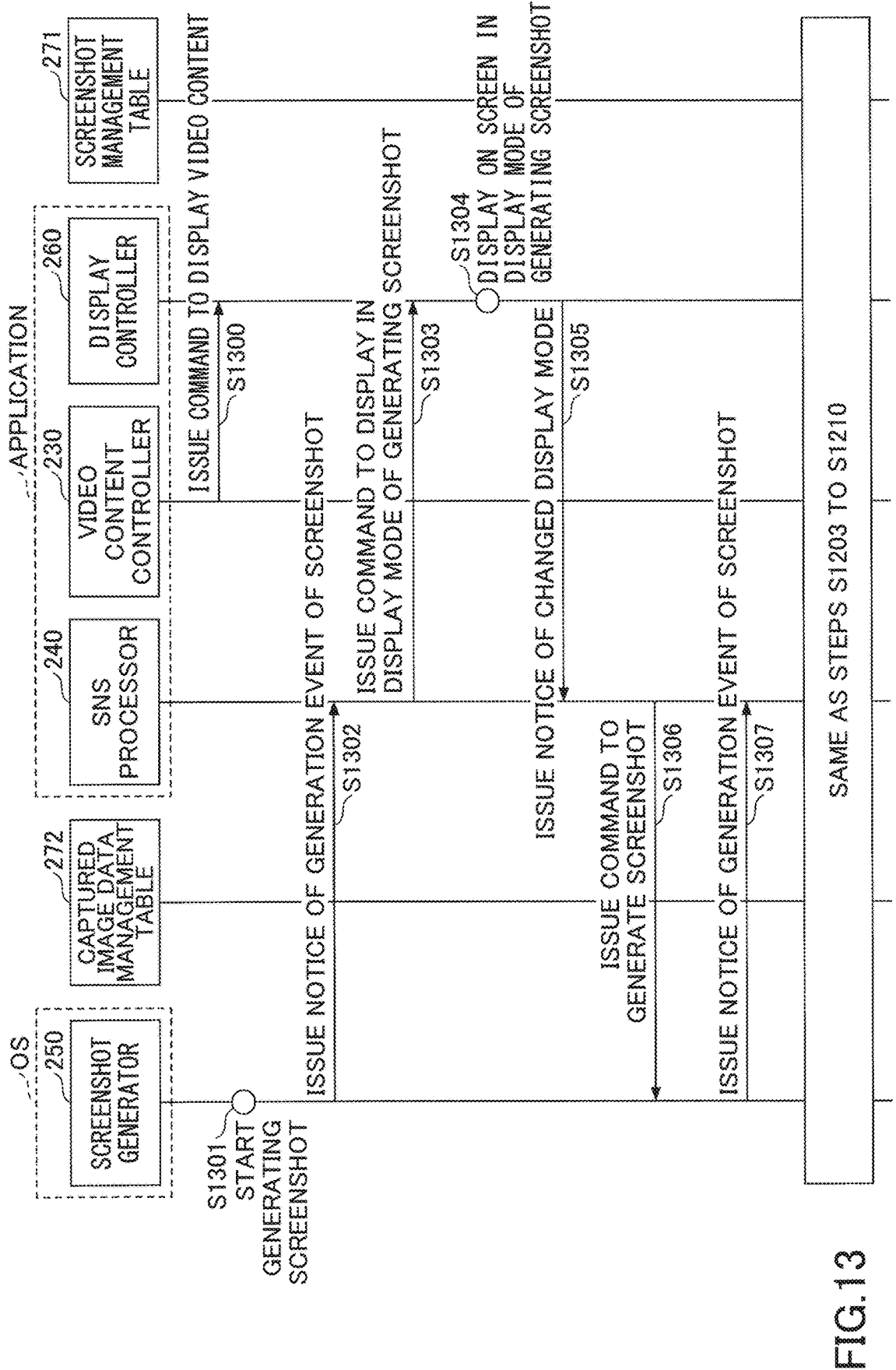
FIG. 13 is a diagram illustrating a second example of an operating sequence according to at least one example embodiment.

Note that at Operation S1307, the SNS processor 240 obtains the screenshot stored in the captured image data management table 272 after the time when the screenshot generation event was received. When the operating sequence in FIG. 13 is executed on the terminal 20, two screenshots are generated. This is because the screenshot generated after Operation S1306 better fits on the screen in an appropriate display mode.

Also, in the operating sequence described above, although the SNS processor 240 issues a notice to the screenshot generator 250 of a command to generate a screenshot via the API, a generation command can of course be transmitted from another function deployed in the application via the API.

Figure 14:
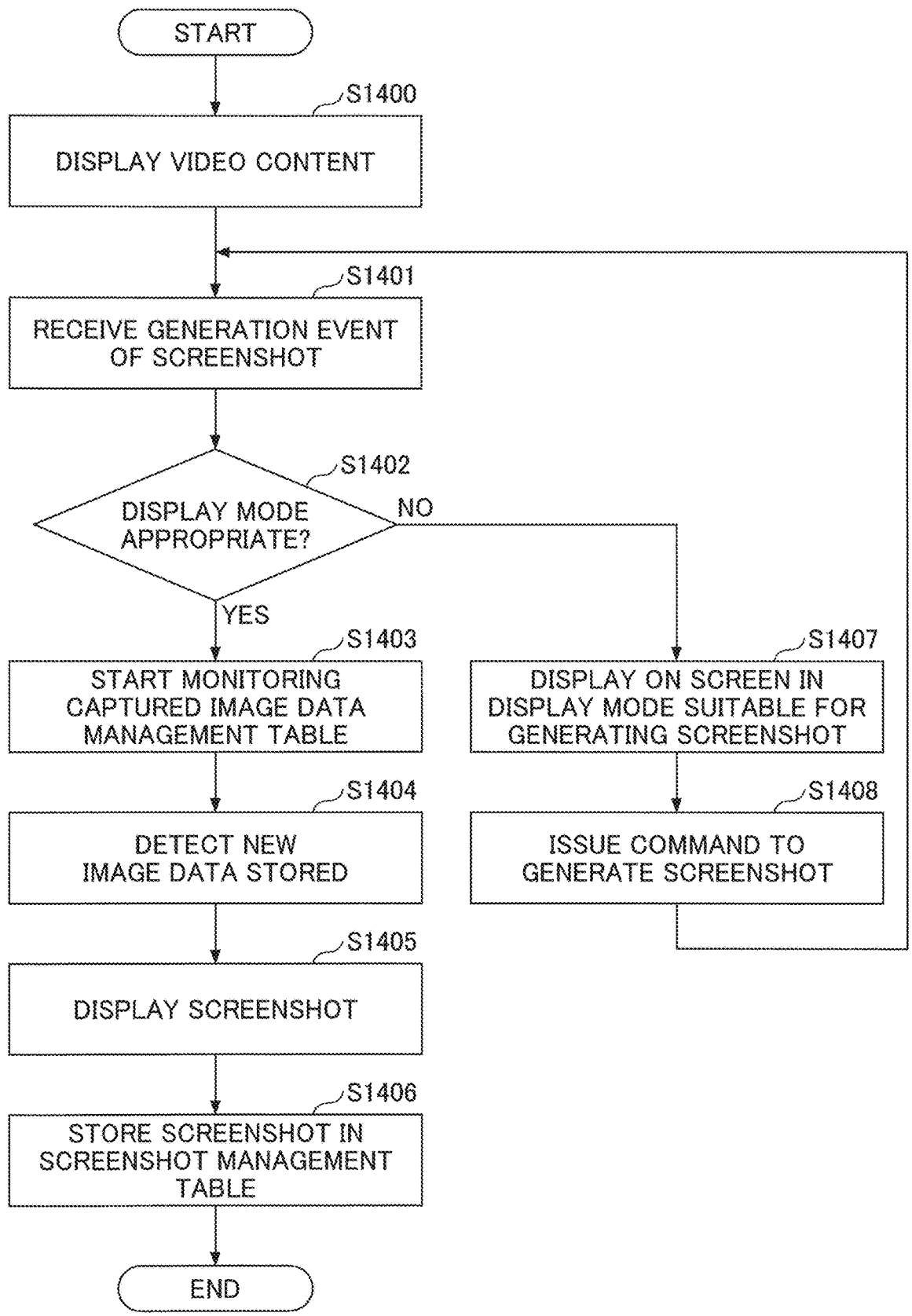
FIG. 14 is a diagram illustrating an example of an operation flow according to at least one example embodiment.

Next, by using FIG. 14, an operation flow of functions of the application of the terminal 20 will be described according to the second example embodiment.

At Operation S1400, the video content controller 230 issues a command to the display controller 260 to display a video content received from the information processing apparatus 10 on the screen. The display controller 260 displays the video content on the screen.

At Operation S1401, the SNS processor 240 receives a screenshot generation event from the screenshot generator 250 via the API.

At Operation S1402, in response to receiving the command from the SNS processor 240, the display controller 260 determines whether the video content is displayed on the screen in the display mode suitable for generating a screenshot.

When the video content is displayed on the screen in the display mode suitable for generating a screenshot (YES at Operation S1402), the process proceeds to Operation S1403. On the other hand, if the video content is not displayed on the screen in the display mode suitable for generating a screenshot (NO at Operation S1402), the process proceeds to Operation S1407.

At Operation S1403, the SNS processor 240 starts monitoring the captured image data management table 272.

At Operation S1404, when the SNS processor 240 detects that new image data has been stored in the captured image data management table 272, the SNS processor 240 obtains the new image data and determines the new image data as the generated screenshot.

At Operation S1405, the SNS processor 240 issues a command to the display controller 260 to display the screenshot.

At Operation S1406, the SNS processor 240 stores the screenshot in the screenshot management table 271, and then, ends the process.

At Operation S1407, the SNS processor 240 issues a command to the display controller 260 to display the video content in the display mode suitable for generating a screenshot. In response to receiving the command, the display controller 260 displays the video content on the screen in the display mode suitable for generating a screenshot.

At Operation S1408, the SNS processor 240 transmits a command to generate a screenshot to the screenshot generator 250 via the API, and the process proceeds to Operation S1401.

Next, a screen display on the terminal 20 according to the modified example will be described by using FIGS. 15A-15B.

Figure 15A:
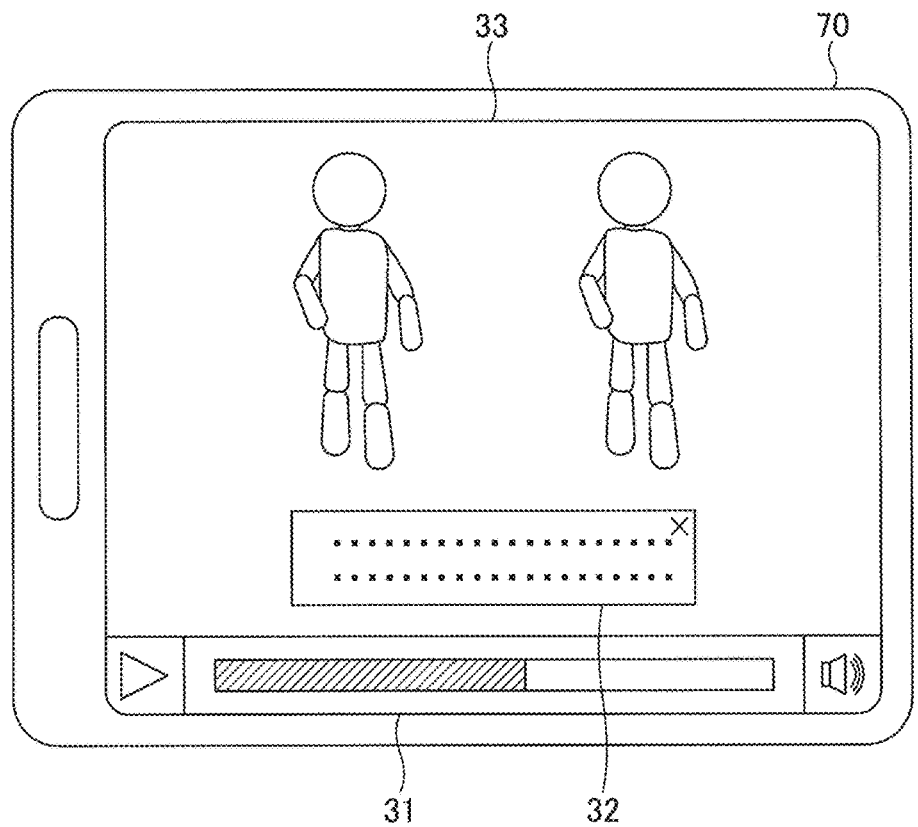
FIGS. 15A-15B are diagrams illustrating examples of a screen of a terminal according to at least one example embodiment.

FIG. 15A is a diagram illustrating an example of a screen display determined at Operation S1402 that a video content is not displayed in the display mode suitable for generating a screenshot. On the screen of the terminal 20, along with a video content 33 being played back, icons 31 for operating the video content 33 and a message 32 such as an advertisement are displayed.

Figure 15B:
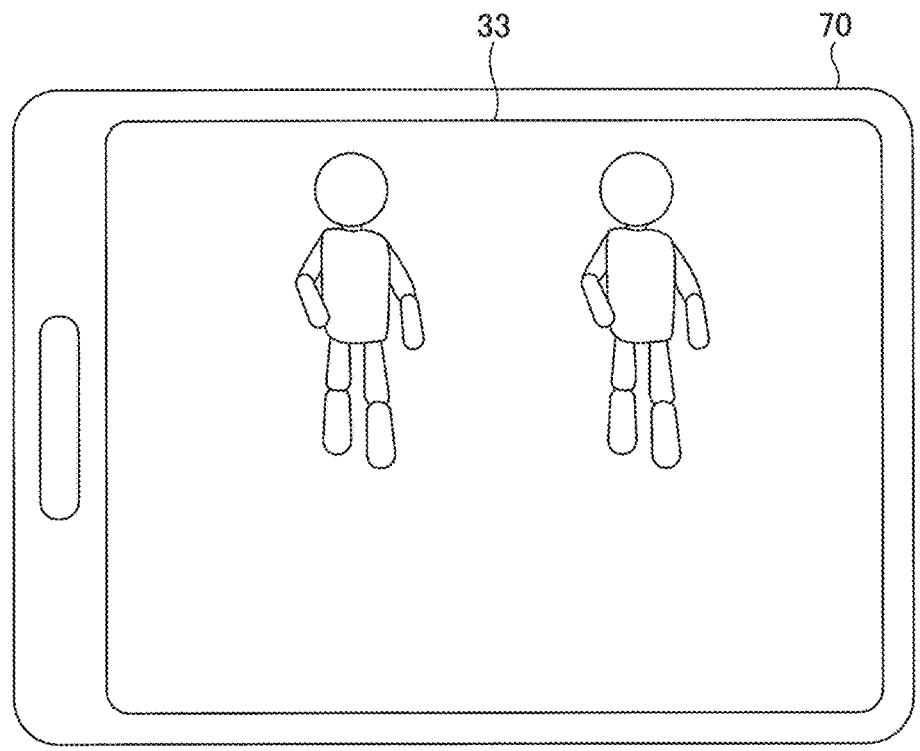

FIG. 15B is a diagram illustrating an example of a screen display determined at Operation S1402 that a video content is being displayed in the display mode suitable for generating a screenshot. On the screen of the terminal 20, the video content 33 being played back is displayed, but no icon for operation, no advertisement message, and the like are displayed.

According to the modified example, it is possible to generate a screenshot based on a video content displayed in the display mode for generating a screenshot.

Note that in the modified example, although the SNS processor 240 transmits a command to generate a screenshot to the screenshot generator 250 via the API, the screenshot generator 250 may execute a process of generating the screenshot when a command to generate a screenshot is transmitted from the user of the terminal 20 to the acceptor 220. For example, when the video content is displayed in the display mode suitable for generating a screenshot, the display controller 260 may display a message requesting the user to input a screenshot command to the acceptor 220 on the screen, based on the input from the user, so as to cause the screenshot generator 250 to generate a screenshot.

<Hardware Configuration>

Next, the hardware configuration of the terminal 20 according to the second example embodiment will be described. The terminal 20 has substantially the same hardware configuration as in the first example embodiment.

Functions of the terminal 20 are implemented by reading the application program and the OS program stored in the ROM 202 and/or the storage device 204 and causing the CPU 201 to execute the program.

For example, the CPU 201 executes a program of the OS to implement the screenshot generator 250 that captures an image of the screen and generates a screenshot by executing a program of the OS. For example, by executing the application program, the SNS processor 240 that executes a process related to the SNS, the video content controller 230 that executes a process related to the received video content, and the display controller 260 that displays a video content or a generated screenshot on the screen, are implemented, respectively.

In response to receiving a command to generate a screenshot from the user of the terminal 20 via the input/output device 205, the CPU 201 causes the screenshot generator 250 to operate to execute a process of generating a screenshot, and executes a process of issuing a notice of a screenshot generation event to the application via the API.

In response to receiving the screenshot generation event via the API, the CPU 201 causes the SNS processor 240 to operate, to start monitoring the captured image data management table 272 stored in the storage device 204. When detecting that new image data has been stored in the captured image data management table 272, the SNS processor 240 executes a process of obtaining new image data as the generated screenshot.

Also, the CPU 201 causes the SNS processor 240 to operate, to issue a command to generate a screenshot to the screenshot generator 250 via the API. Also, the CPU 201 causes the SNS processor 240 to operate, to issue a command to the display controller 260 to display the video content being displayed on the screen in the display mode suitable for generating a screenshot. The CPU 201 causes the display controller 260 to operate, to display the video content being displayed on the screen in the display mode suitable for generating a screenshot.

Third Example Embodiment

Next, a third example embodiment will be described. Description will be omitted for parts common to the first example embodiment and the second example embodiment, and only different parts will be described.

<System Configuration>

Figure 16:
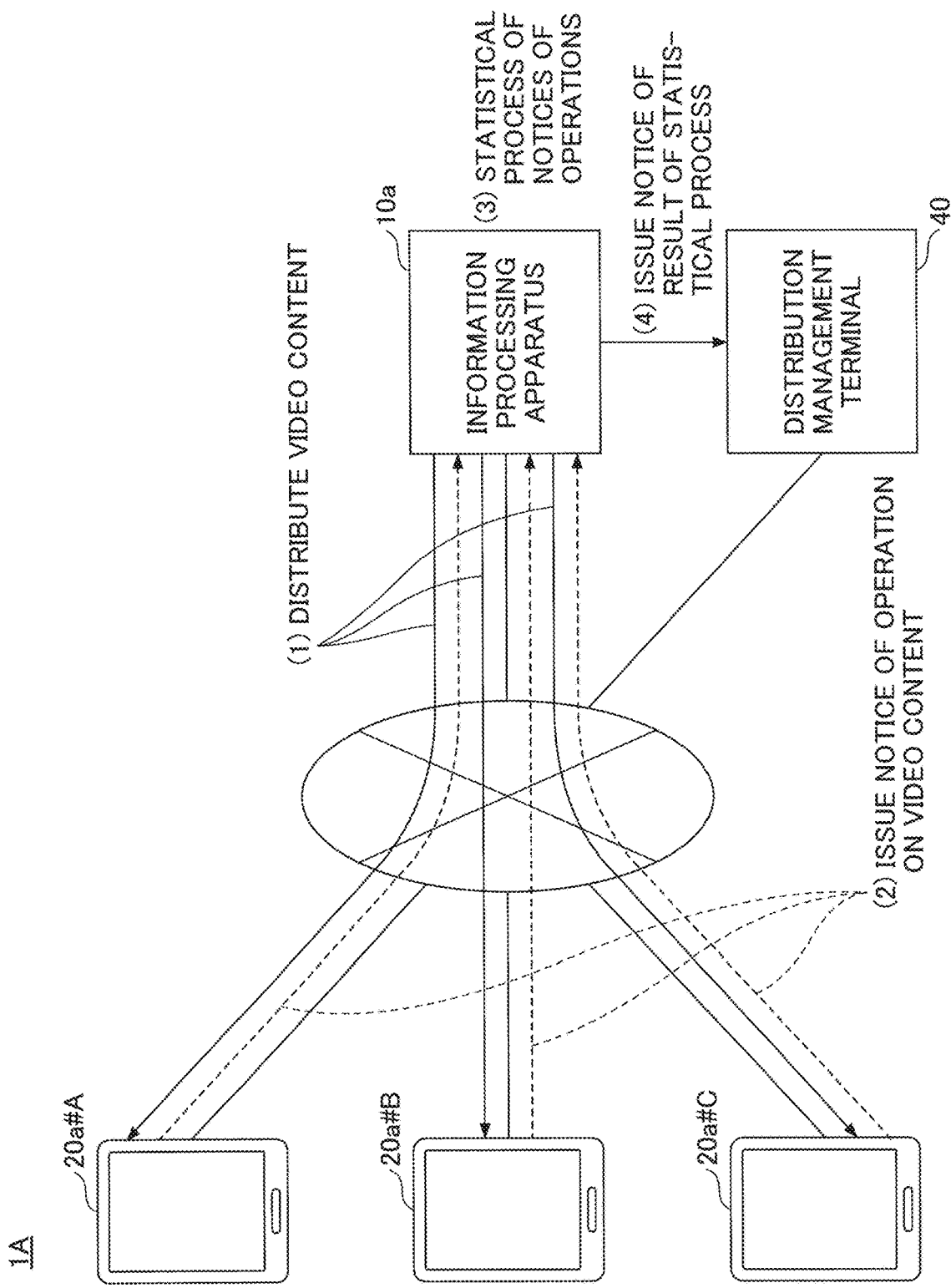
FIG. 16 is a diagram illustrating an example of a system configuration according to at least one example embodiment.

An information processing system 1A will be described according to the third example embodiment by using FIG. 16. The information processing system 1A includes a distribution management terminal 40 in addition to terminals 20 a (20 a#A, 20 a#B, and 20 a#C) and an information processing apparatus 10a. The terminals 20 a, the information processing apparatus 10a, and the distribution management terminal 40 are connected to the network 30.

The distribution management terminal 40 is a device managed by a provider of video contents, to transmit and receive various information items with the information processing apparatus 10a that distributes the video contents.

The information processing apparatus 10a distributes a video content in response to a request from each terminal 20 a (Operation (1)). Although FIG. 16 illustrates a state in which video contents are distributed to the terminal 20 a#A, the terminal 20 a#B, and the terminal 20 a#C, the number of terminals 20 a as distribution destinations is not limited in particular.

Each of the terminals 20 a displays the distributed video content on the screen to play back the content. If receiving from each user a desired and/or predetermined operation on the video content while playing back the video content on each of the terminals 20 a, each of the terminals 20 a transmits a notice of the operation to the information processing apparatus 10a (Operation (2)). The notice of the operation includes information identifying the position of the video content being played back. The desired and/or predetermined operation is, for example, an operation for generating a screenshot of the video content displayed on the screen, an operation for registering as a favorite a part of the video content being played back, and the like.

The information processing apparatus 10a executes a statistical process on the received notices of the operations (Operation (3)). For example, the information processing apparatus 10a totals the number of operations for each position of a video content. Performing the statistical process clarifies a position in the video content, namely, a scene in the video content to which the users having viewed the video content have paid a high attention.

The information processing apparatus 10a issues a notice of a result of the statistical process to the distribution management terminal 40 (Operation (4)).

The distribution management terminal 40 executes various processes on the video contents based on the received result of the statistical process. For example, if the video content is being distributed by a live broadcast, the provider of the video content may read the result of the statistical process received by the distribution management terminal 40, to use it with respect to progress of the live-broadcasted video content.

Based on the result of the statistical process, the information processing apparatus 10a may set a highlight part in a video content or set a thumbnail to be displayed on a screen for accepting a selection of a video content. Note that these settings may be executed by the information processing apparatus 10a based on a command from the distribution management terminal 40.

<Outline of Statistical Process>

Figure 17A:
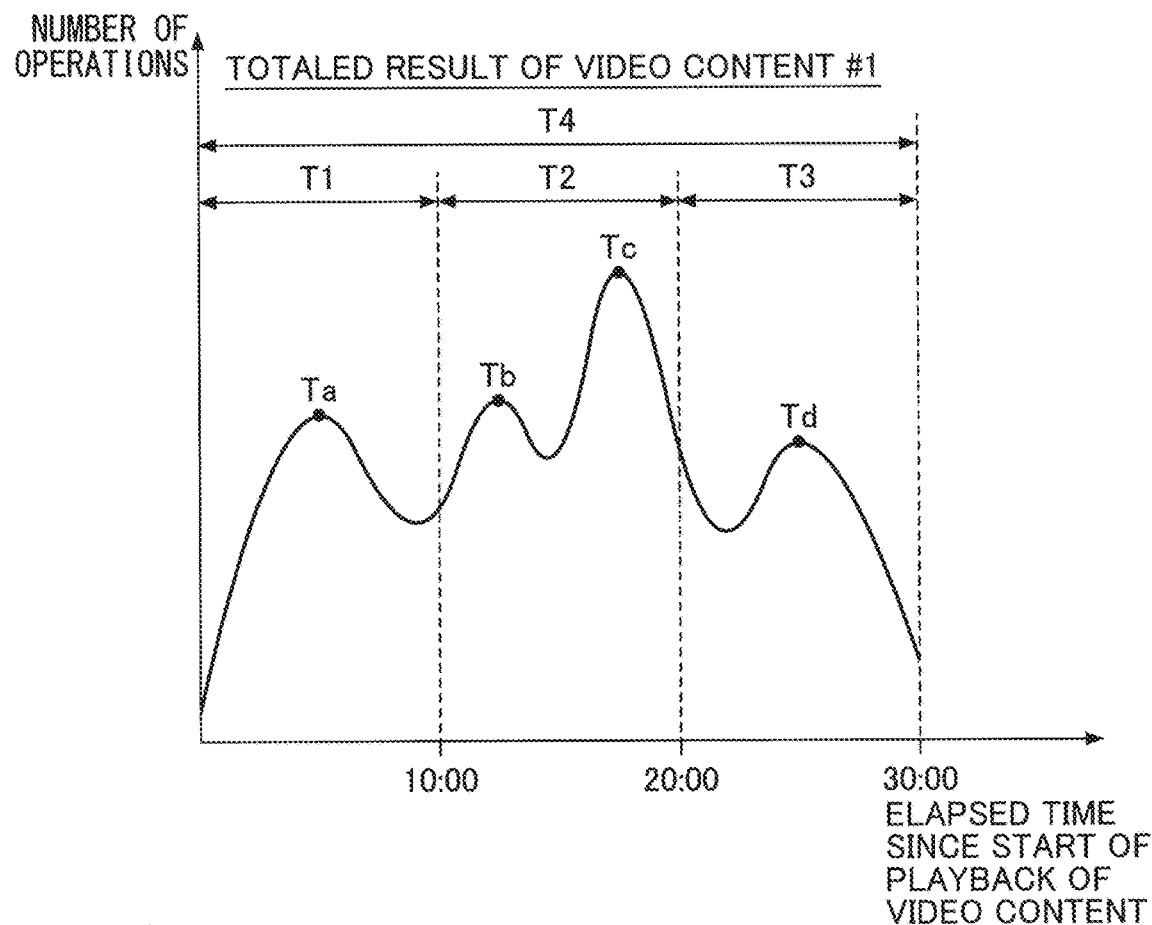
FIGS. 17A-17B are diagrams illustrating an outline of a totaling process according to at least one example embodiment.

By using FIGS. 17A-17B, an outline of the statistical process according to at least one example embodiment described above will be described. FIG. 17A is a graph illustrating a result of the statistical process executed by the information processing apparatus 10a when distributing a video content #1 according to at least one example embodiment. The horizontal axis represents "the elapsed time from the start of a playback of the video content", and the vertical axis represents "the number of operations". From FIG. 17A, it can be seen that the number of operations received from the users is remarkably large at times Ta, Tb, Tc, and Td.

As described above, the information processing apparatus 10a sets a highlight part and sets a thumbnail in a video content.

When setting highlight parts of a first part (period T1), a middle part (period T2), and a last part (period T3), respectively, in the video content #1, the information processing apparatus 10a sets desired and/or predetermined periods in the period T1, the period T2, and the period T3 in the video content #1 as the highlight parts. For example, the information processing apparatus 10a may set a desired and/or predetermined period including the time Ta as the highlight part of the first part, set a desired and/or predetermined period including the time Tc as the highlight part of the middle part, and a desired and/or predetermined period including the time Td as the highlight part of the last part.

The information processing apparatus 10a may generate a thumbnail to be displayed on the screen of the terminal 20 a when promoting selection of the video content #1 based on the screen at the time Tc of the video content #1.

Similarly, based on the screens at the times Ta, Tc, and Td of the video content #1, the information processing apparatus 10a may generate thumbnails to be displayed on the screen of the terminal 20 a, when promoting selection of the highlight part of the first part, the highlight part of the middle part, and the highlight part of the last part of the video content #1.

Note that in this case, the playback time of the video content #1 lasts 30 minutes, the period T1 is a period lasting for 10 minutes from the start of the playback of the video content #1; the period T2 is a period lasting for 10 minutes from 10 minutes elapsed since the start of the playback of the video content #1 until 20 minutes; and the period T3 is a period lasting for 10 minutes from 20 minutes elapsed since the start of the playback of the video content #1 until 30 minutes. The period T 4 is a period from the start to the end of the playback of the video content.

Figure 17B:
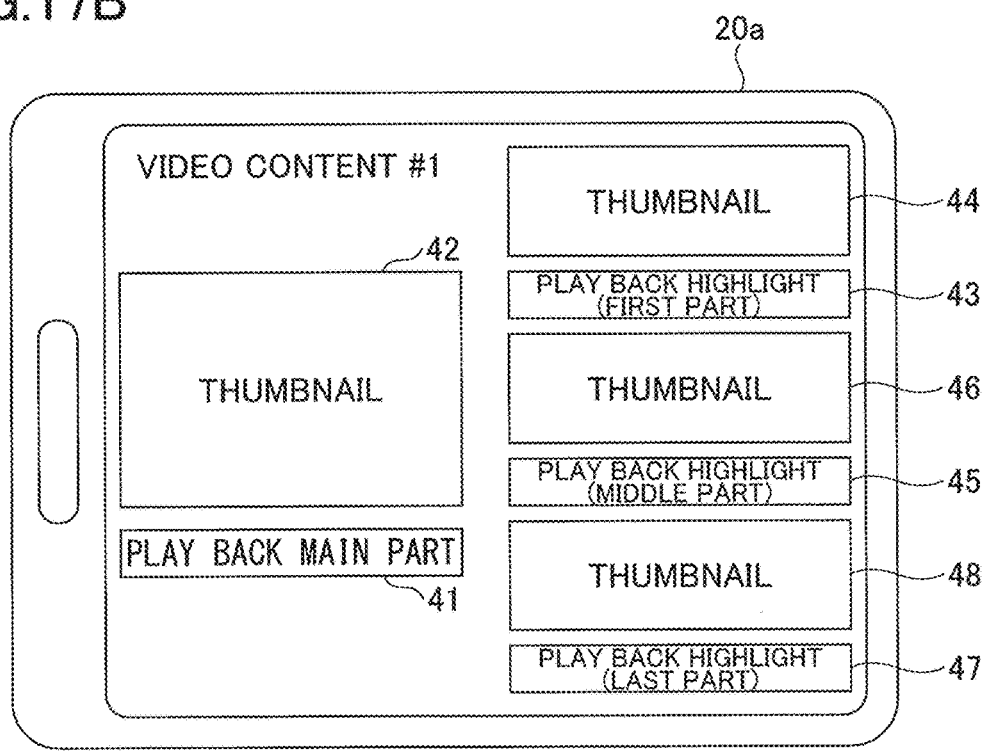

FIG. 17B is a diagram illustrating an appearance of a selection screen of the video content #1 displayed on the terminal 20 a, generated based on the result of the statistical process, according to at least one example embodiment. A video content selection button is displayed in association with each of the thumbnails.

In response to receiving from the user a selection from among the video content selection buttons, which are "play back main part 41", "play back highlight (first part) 43", "play back highlight (middle part) 45", and "play back highlight (last part) 47", in other words, in response to receiving a selection of one of the generated thumbnails, the terminal 20 a obtains the corresponding video content from the information processing apparatus 10a, to play back the obtained video content on the screen of the terminal 20 a.

For example, as the thumbnail 42, a thumbnail generated based on the video content #1 at the time Tc at which the number of operations is the largest, may be displayed. As the thumbnail 44, a thumbnail generated based on the video content #1 at the time Ta at which the number of operations is the largest during the period T1, may be displayed. As the thumbnail 46, a thumbnail generated based on the video content #1 at the time Tc at which the number of operations is the largest during the period T2, may be displayed. As the thumbnail 48, a thumbnail generated based on the video content #1 at the time Td at which the number of operations is the largest during the period T3, may be displayed.

In the example in FIG. 17B, although one thumbnail is associated with each of the main part, the highlighted first part, the highlighted middle part, and the highlighted last part of the video content #1, multiple thumbnails can of course be associated with each of the main part, the highlighted first part, the highlighted middle part, and the highlighted last part of the video content #1. In this case, the terminal 20 *a* may accept an operation of the user to change a displayed thumbnail. For example, the information processing apparatus 10*a* identifies times during the periods of a video content to be distributed (for example, periods T1, T2, T3, and T4) at which a large number of operations have been performed, to generate thumbnails based on the video content at times within a desired and/or predetermined rank (for example, within the top five rankings).

<Functional Configuration>

(1) Information Processing Apparatus

Figure 18:
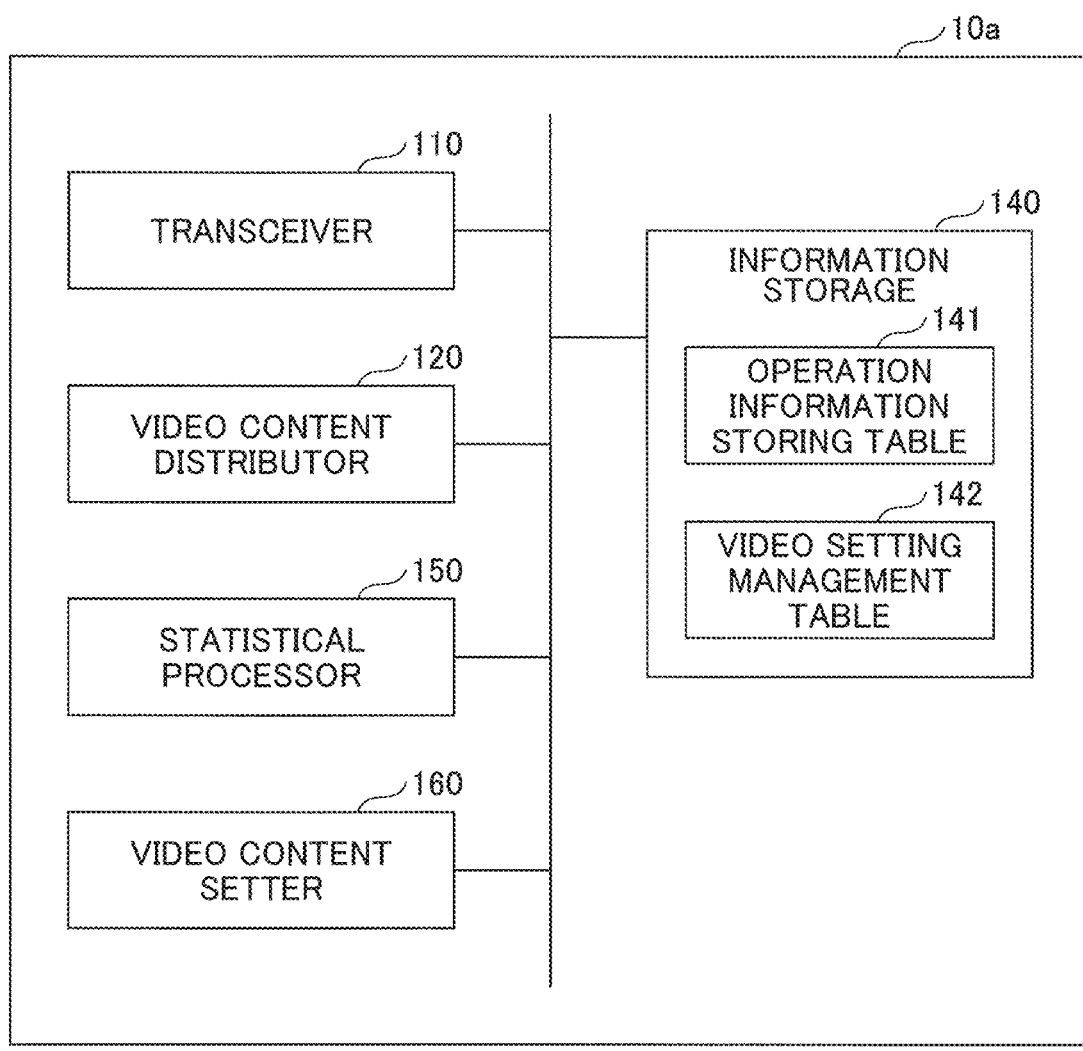
FIG. 18 is a diagram illustrating an example of a functional configuration of an information processing apparatus according to at least one example embodiment.

By using FIG. 18, a functional configuration of the information processing apparatus 10*a* according to at least one example embodiment will be described. The same reference codes are given to the same functions as those in the first example embodiment and the second example embodiment.

The information processing apparatus 10*a* includes a transceiver 110, a video content distributor 120, a statistical processor 150, and/or a video content setter 160, etc. These functions are implemented by causing the at least one CPU 301 (and/or other processors or other processing devices, etc.) to process one or more programs installed in the information processing apparatus 10*a* to function as the transceiver 110, the video content distributor 120, the statistical processor 150, and/or the video content setter 160, etc.

The information processing apparatus 10 also includes an information storage 140 (e.g., information storage device). The information storage 140 includes an operation information storing table 141 and/or a video setting management table 142, etc. The information storage 140 can be implemented, for example, by the storage device 304.

Since the functions of the transceiver 110 and the video content distributor 120 are substantially the same as in the first example embodiment and the second example embodiment, the description will be omitted.

The statistical processor 150 receives a notice of an operation on a video content from the terminal 20 *a*, to execute a statistical process based on the received notices of the operations. The notice of an operation includes the identifier of the video content and the position at which the operation was received. The notice of an operation may also include the content of the operation. The content of an operation is, for example, an operation of generating a screenshot, an operation of favorite registration, an operation related to recording of the video content, and the like.

The statistical process is, for example, to execute a process of totaling the number of operations received at each position in a video content. The statistical processor 150 may calculate a change (e.g., an increase rate or a decrease rate) of the number of operations in addition to the process of totaling. Also, in the case where the content of an operation is included in the notice of the operation, the statistical processor 150 may calculate statistical information for each operation.

The statistical processor 150 stores a result of the statistical process in the operation information storing table 141. Also, the statistical processor 150 issues a notice of the result of the statistical process to the distribution management terminal 40. The statistical processor 150 may generate a graph or the like based on the result of the statistical process and issues a notice of the generated graph or the like to the distribution management terminal 40.

Note that the statistical processor 150 may issue a notice of operations to be transmitted as the notice of the operation to the terminal 20 *a* in advance.

Based on the information stored in the operation information storing table 141, the video content setter 160 executes a process of generating a thumbnail to be displayed on a video content selection screen, and a process of setting of a highlight part, to store the execution result in the video setting management table 142. The video content setter 160 may execute a process on the video content in response to a command from the distribution management terminal 40.

Next, the operation information storing table 141 and the video setting management table 142 stored in the information storage 140 will be described by using FIGS. 19 and 20.

An example of the operation information storing table 141 is illustrated in FIG. 19. The operation information storing table 141 stores results of the statistical process processed by the statistical processor 150. The example in FIG. 19 illustrates a state of the operation information storing table 141 that stores the identifier of a video content, elapsed times from the start of the playback of the video content (in other words, the position in the video content) each of which is associated with the number of received operations. Change in the number of operations may be stored in the operation information storing table 141. Also, in the case where the content of an operation is included in the notice of the operation, the number of received operations for each content of the operation may be stored.

An example of the video setting management table 142 is illustrated in FIG. 20. The video setting management table 142 stores processed results of the settings for the video content set by the video content setter 160. In the example in FIG. 20, a video content identifier, setting contents of a main part, and setting contents of highlight parts are stored in association with each other. As the setting contents for the main part, a "video content" as video content data, a thumbnail setting position, and a thumbnail as thumbnail data are stored. Also, as the highlight part setting contents, a highlight identifier as the identifier of the highlight part, a display title as the title when displayed on the screen of the terminal 20 *a*, a setting time during which the highlight part is set in the video content, a thumbnail setting position, and a thumbnail as data of "thumbnail" are stored.

(2) Distribution Management Terminal

Figure 21:
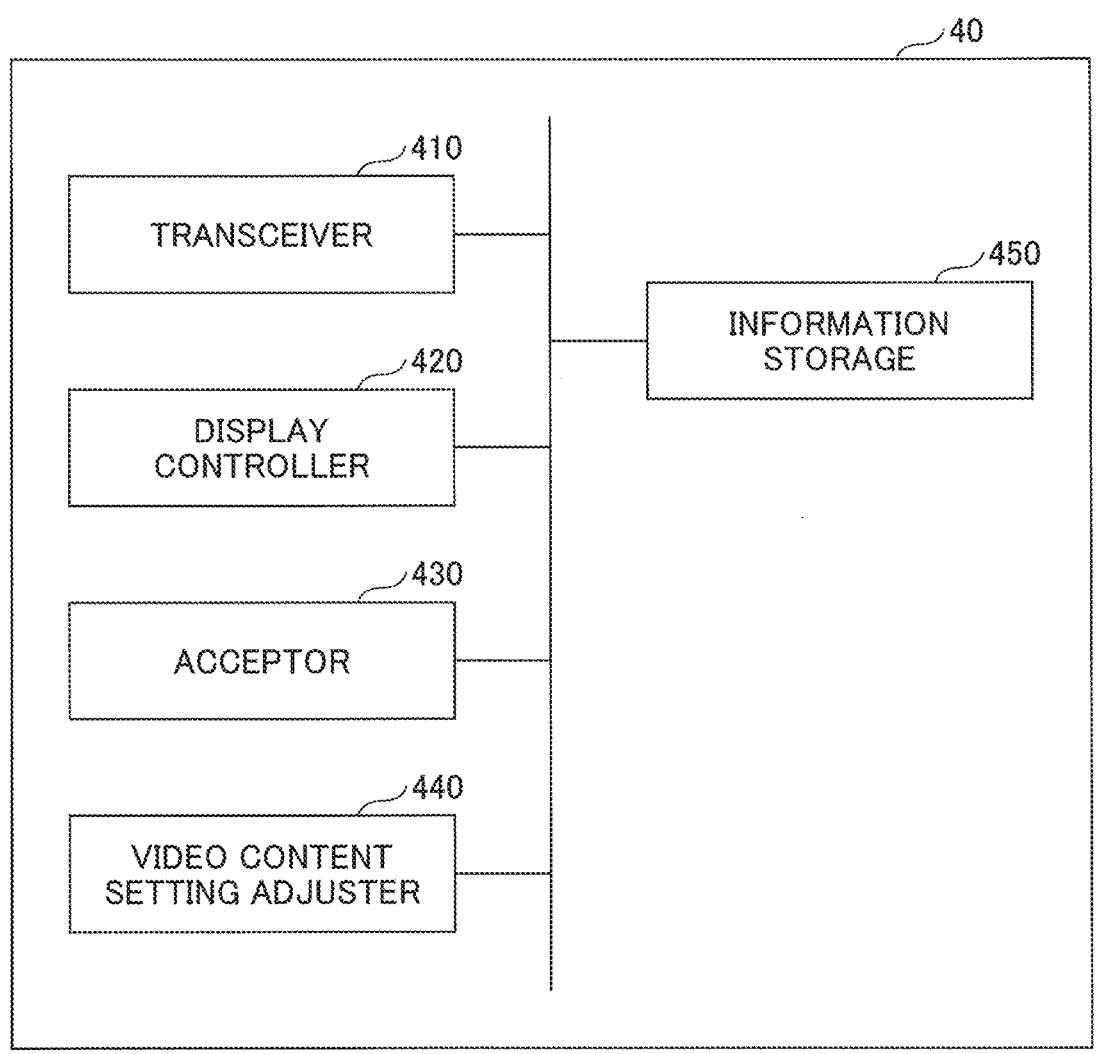
FIG. 21 is a diagram illustrating an example of a functional configuration of a distribution management terminal according to at least one example embodiment.

By using FIG. 21, a functional configuration of the distribution management terminal 40 according to at least one example embodiment will be described. The distribution management terminal 40 has substantially the same hardware configuration as a general computer, and is implemented, for example, by the hardware illustrated in FIG. 4.

The distribution management terminal 40 includes a transceiver 410, a display controller 420, an acceptor 430, and/or a video content setting adjuster 440, etc. One or more of these functions are implemented by causing the at least one CPU 301 (and/or other processors or other processing devices, etc.) to process one or more programs installed in the distribution management terminal 40 (e.g., information storage device). The distribution management terminal 40 also includes an information storage 450. The information storage 450 may be implemented, for example, by the storage device 304.

The transceiver 410 transmits and receives data with the information processing apparatus 10a.

The display controller 420 displays a result (e.g., a graph) of a statistical process on the video content received from the information processing apparatus 10a, on the screen of the distribution management terminal 40.

The acceptor 430 accepts various commands related to settings of a video content from a provider of contents as the user of the distribution management terminal 40. For example, the acceptor 430 may accept a command related to the position within the video content for generating a thumbnail and settings of a highlight part.

When the acceptor 430 accepts a command for the video content, the video contents setting adjuster 440 transmits a command to apply the settings on the video content to the information processing apparatus 10a.

The information storage 450 stores various items of information. For example, the information storage 450 stores a result of the statistical process on the video content received from the information processing apparatus 10a.

(3) Terminal

Figure 22:
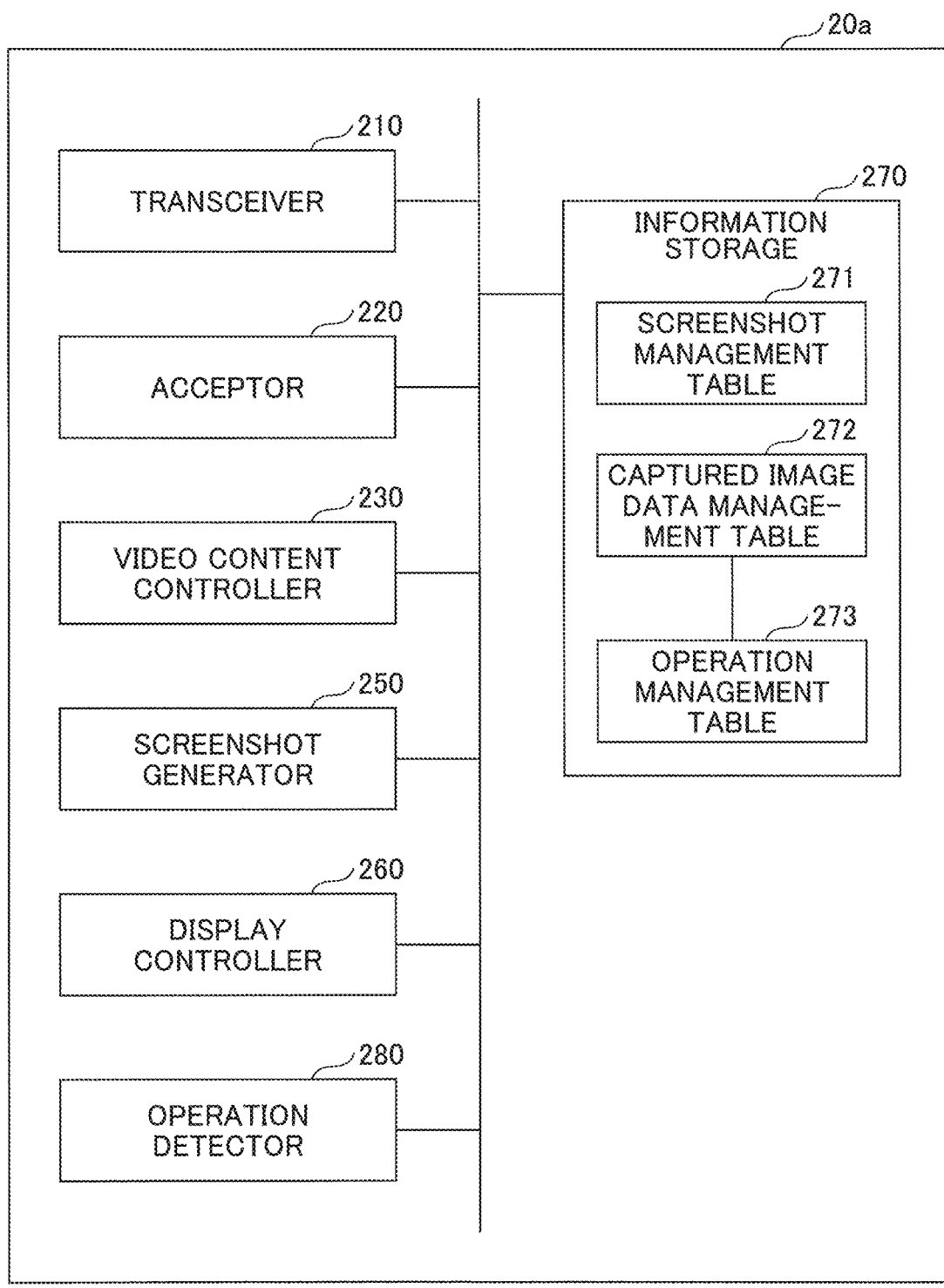
FIG. 22 is a diagram illustrating an example of a functional configuration of a terminal according to at least one example embodiment.

By using FIG. 22, a functional configuration of the terminal 20 a according to at least one example embodiment will be described. The same reference codes are given to the same functions as those in the first example embodiment and the second example embodiment. The terminal 20 a includes a transceiver 210, an acceptor 220, a video content controller 230, a screenshot generator 250, a display controller 260, and/or an operation detector 280, etc. These functions are implemented by causing the at least one CPU 301 (and/or other processors or other processing devices, etc.) to process one or more programs installed in the information processing apparatus 10a to function as one or more of the transceiver 210, the acceptor 220, the video content controller 230, the screenshot generator 250, the display controller 260, and/or the operation detector 280, etc.

The terminal 20 a also includes an information storage 270. Also, the information storage 270 includes a screenshot management table 271, a captured image data management table 272, and/or an operation management table 273, etc. The information storage 270 can be implemented, for example, by the storage device 304.

Since the functions of the transceiver 210, the acceptor 220, the video content controller 230, the screenshot generator 250, and/or the display controller 260, etc., are substantially the same as in the first example embodiment and the second example embodiment, the description will be omitted.

The operation detector 280 detects a content of an operation received by the acceptor 220 from the user of the terminal 20 a, to determine whether or not the operation matches a desired and/or predetermined operation. If the content of the operation matches a desired and/or predetermined operation, the operation detector 280 issues a notice of the content of the operation to the information processing apparatus 10a, together with the identifier of the video content being played back and the position in the video content. The operation detector 280 refers to the operation management table 273 to determine whether or not the content of the operation matches a desired and/or predetermined operation. For example, if the desired and/or predetermined operation is an operation of generating a screenshot, the operation detector 280 issues a notice indicating that the operation has been detected to the information processing apparatus 10a.

Since substantially the same information is managed in the screenshot management table 271 and the captured image data management table 272 as in the first example embodiment and the second example embodiment, the description will be omitted.

In the operation management table 273, operations to be indicated to the information processing apparatus 10a when the acceptor 220 accepts an operation on the video content from the user are set. The information stored in the operation management table 273 may be set based on a command from the information processing apparatus 10a. Also, the content of the operation to be indicated may be set for each video content.

<Operations>

(1) Operating Sequence

Figure 23A:
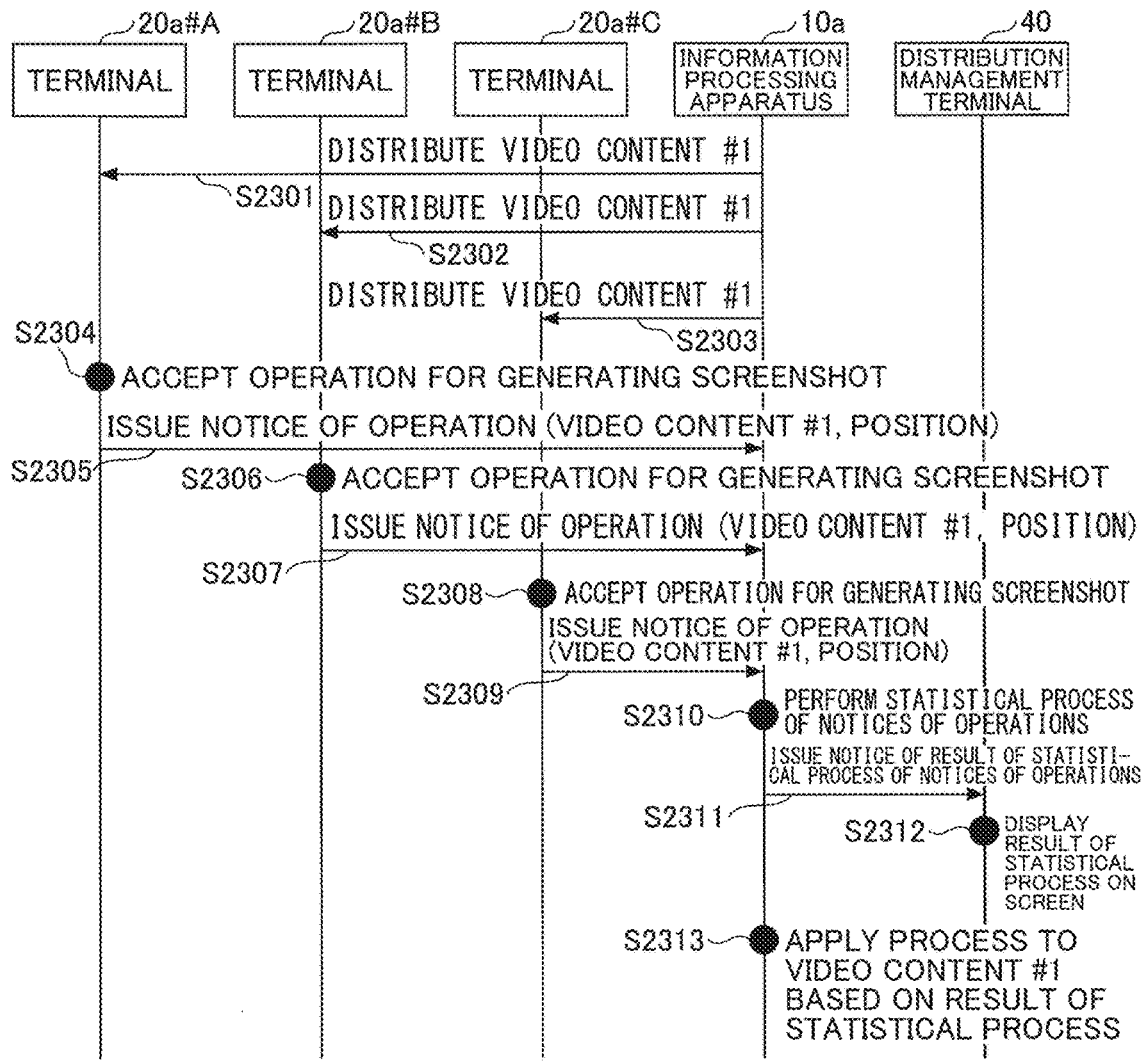
FIGS. 23A-23B are diagrams illustrating an example of an operating sequence according to at least one example embodiment.
Figure 23B:
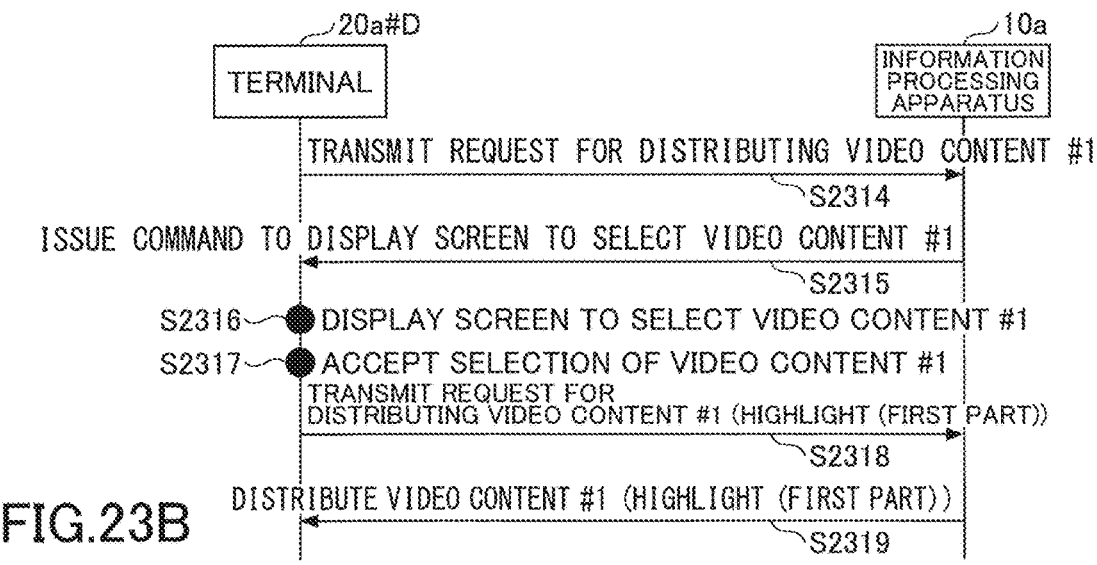

By using FIGS. 23A-23B, an operating sequence according to the third example embodiment will be described, but the example embodiments are not limited thereto. Assume in FIGS. 23A-23B that the user A uses the terminal 20 a#A, the user B uses the terminal 20 a#B, the user C uses the terminal 20 a#C, and a user D uses a terminal 20 a#D. Also assume that the terminal 20 a is set so as to transmit a notice of an operation to the information processing apparatus 10a when accepting an operation of generating a screenshot from the user. First, by using FIG. 23A, an operating sequence will be described when the information processing apparatus 10a receives a notice of an operation from the terminal 20 a.

At Operation S2301, the information processing apparatus 10a distributes the video content #1 to the terminal 20 a#A.

At Operation S2302, the information processing apparatus 10a distributes the video content #1 to the terminal 20 a#B.

At Operation S2303, the information processing apparatus 10a distributes the video content #1 to the terminal 20 a#C.

At Operation S2304, the terminal 20 a#A receives an operation of generating a screenshot from the user A.

In response to receiving the operation to generate a screenshot, at Operation S2305, the terminal 20 a#A transmits a notice of the operation to the information processing apparatus 10a. The notice of the operation includes the identifier of the video content #1 and a position of the video content #1 when accepting the operation of the screenshot.

At Operations S2306 and S2307, substantially the same process as at Operations S2304 and S2305 is executed on the terminal 20 a#B. Also, at Operations S2308 and 52309, substantially the same process as at Operations S2304 and S2305 is executed on the terminal 20 a#C.

At Operation S2310, the information processing apparatus 10a executes a statistical process on the notices of the operations. For example, the information processing apparatus 10a totals the number of operations accepted for each position of the video content #1.

At Operation S2311, the information processing apparatus 10a issues a notice of the result of the statistical process to the distribution management terminal 40.

At Operation S2312, the distribution management terminal 40 displays the result of the statistical process on the screen.

At Operation S2313, the information processing apparatus 10a executes a process on the video content #1 based on the result of the statistical process. For example, the information processing apparatus 10a sets a thumbnail of the video content #1, sets highlight parts, and the like.

Note that the terminals 20 a to which the video content #1 is distributed are of course not limited to the terminal 20 a#A, the terminal 20 a#B, and the terminal 20 a#C.

Next, an operating sequence will be described that is executed when a request for distributing the video content #1 is received from the terminal 20 a#D after the Operation S2313 has been executed.

At Operation S2314, the terminal 20 a#D transmits a request for distributing the video content #1 to the information processing apparatus 10a.

At Operation S2315, the information processing apparatus 10a causes the terminal 20 a#D to display a selection screen of the video content #1.

At Operation S2316, the terminal 20 a#D displays a selection screen of the video content #1 on the screen. On the screen of the terminal 20 a#D, information on thumbnails and highlight parts of the video content #1 set at Operation S2313 is displayed. For example, the screen in FIG. 17B is displayed on the screen of the terminal 20 a#D.

At Operation S2317, the terminal 20 a#D accepts a selection of the video content #1 from the user D. In the following description, assume that selection of the highlight part (first part) of the video content #1 has been accepted from the user D.

At Operation S2318, the terminal 20 a#D transmits a request for distributing the highlight part (first part) of the video content #1 to the information processing apparatus 10a.

At Operation S2319, the information processing apparatus 10a distributes the highlight part (first part) of the video content #1 to the terminal 20 a#D.

(2) Operation Flow

Figure 24:
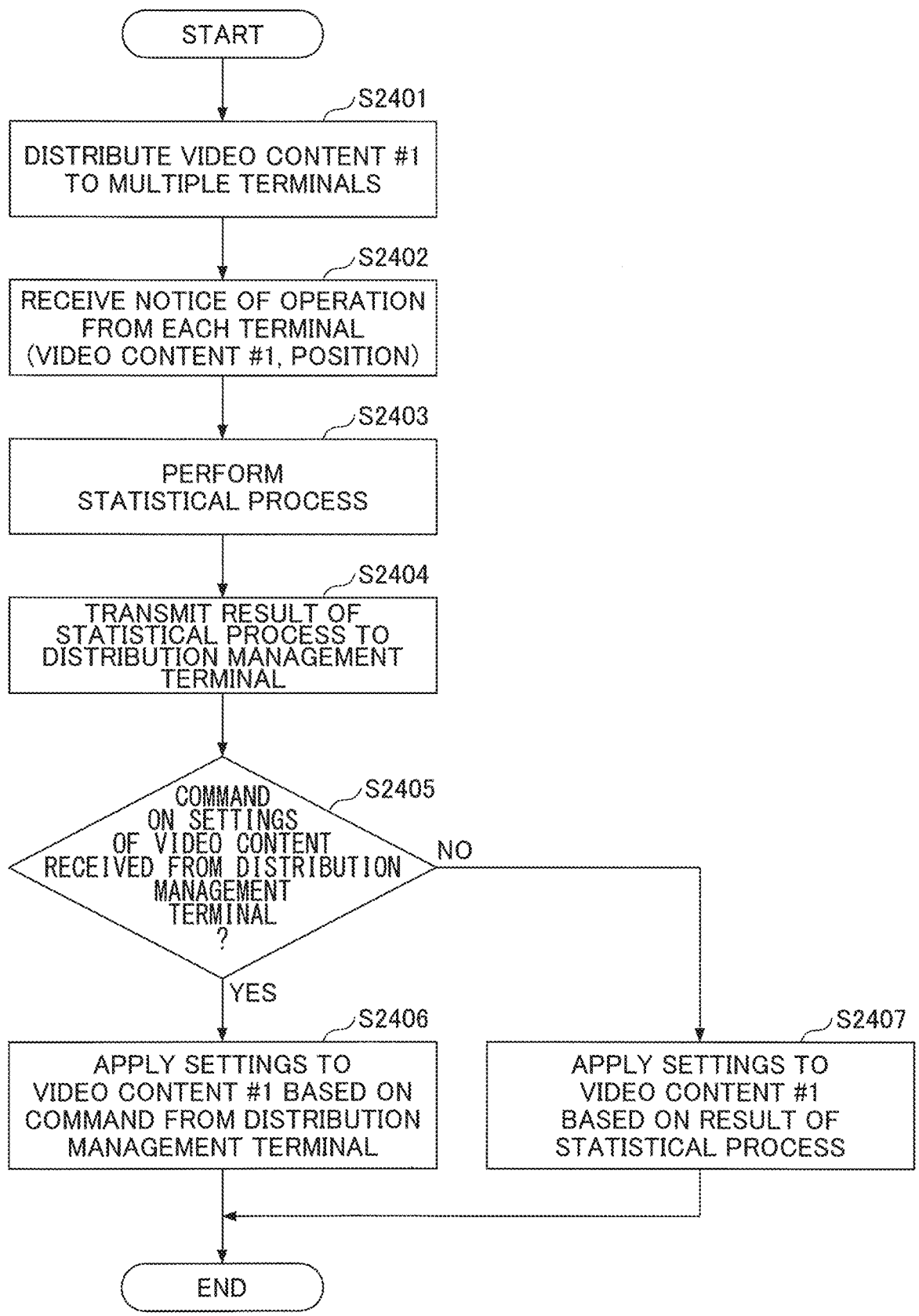
FIG. 24 is a diagram illustrating an example of an operation flow according to at least one example embodiment.

Next, by using FIG. 24, an operation flow of the information processing apparatus 10a according to at least one example embodiment will be described.

At Operation S2401, the video content distributor 120 of the information processing apparatus 10a distributes the video content #1 to multiple terminals 20 a.

At Operation S2402, the statistical processor 150 receives a notice of an operation from each of the terminals 20 a. The notice of the operation includes the identifier of the video content #1 and a position in the video content #1 when the operation was executed.

At Operation S2403, the statistical processor 150 executes a statistical process based on the notices of the operations received from the respective terminals 20 a. For example, the statistical processor 150 may total the number of operations accepted for each position of the video content #1. The statistical processor 150 stores the processed result in the operation information storing table 141.

At Operation S2404, the statistical processor 150 transmits a result of the statistical process to the distribution management terminal 40.

At Operation S2405, the video content setter 160 determines whether or not a command related to settings of the video content has been received from the distribution management terminal 40. If the command has been received (YES at Operation S2405), the process proceeds to Operation S2406. On the other hand, if the command has not been received (NO at Operation S2405), the process proceeds to Operation S2407.

At Operation S2406, the video content setter 160 executes settings on the video content #1 based on a command from the distribution management terminal 40. The settings on the video content #1 include a setting of a thumbnail of the video content #1, a setting of a highlight part, and the like. The video content setter 160 stores the contents of the settings on the video content #1 in the video setting management table 142.

At Operation S2407, the video content setter 160 executes the settings on the video content #1, based on the result of the statistical process of the operations performed on the video content #1 stored in the operation/information storing table 141.

As described above, by using the third example embodiment, the information processing apparatus 10a, which is the distribution source of a video content, can collect positions and contents of operations performed by the users on the video content, to execute a statistical process. Then, based on the result of the statistical process, it is possible for the provider of video contents to adjust the progress of a video content distributed by a live broadcast, and it is possible for the information processing apparatus 10a to set a highlight part of a video content, and to set a thumbnail to be displayed when allowing the user to select a video content.

Other

A non-transitory computer readable recording medium storing a special purpose program code of software that implements the specialized functions of at least one example embodiment described above may be supplied to the terminal 20.

Furthermore, it is needless to say that one or more of the example embodiments described above are realized by the terminal 20 that reads the special purpose program code stored in the non-transitory computer readable recording medium, and executes the special purpose program code. In this case, a program that causes the terminal 20 to execute a display control method described above is stored in the non-transitory computer readable recording medium.

Specifically, a special purpose program is stored in the non-transitory computer readable recording medium for causing a terminal to execute a special purpose process of display control. The process includes displaying a video content on the screen; generating a screenshot of the screen in response to accepting a command to capture an image of the video content being played back; and displaying the generated screenshot in a second area in the screen. When the screenshot is displayed in the second area, the video content is being played back in a first area different from the second area in the screen.

Furthermore, the program code itself read out of the recording medium realizes the functions of one or more of the example embodiments described earlier.

Also, implementation of the functions of one or more of the example embodiment described earlier is not limited to execution by a computer device that has read the program code. An operating system (OS) or the like running on the computer device according to instructions of the program code may execute processing partially or entirely. Furthermore, it is needless to say that the functions of one or more of the example embodiment described earlier may be realized by such processing.

As described above, various example embodiments of the inventive concepts have been described. Note that the inventive concepts are not limited to such example embodiments, and various modifications and substitutions can be made within a scope not deviating from the subject matters of the inventive concepts.

What is claimed is:

1. A Social Networking Service (SNS) server comprising:
a memory including computer readable instructions; and
at least one processor configured to execute the computer readable instructions to, distribute first video content to a first terminal associated with a first user of the SNS, receive a share command from the first terminal, the share command including a command to distribute new image data to at least one sharing user of the SNS selected by the first user, the at least one sharing user associated with the first user, and the new image data being a screen shot generated based on the first video content and stored in the first terminal as a table in association with time position information identifying a time position of the new image data within the first video content, the table further including date and time of generation of the new image data and network location information of the first video content, receive the new image data and the time position information associated with the new image data from the first terminal, determine sharing settings set by the first user on the SNS, the sharing settings including at least one of sharing the new image data in a chat group associated with the first user and sharing the new image data to the at least one sharing user with the first user, and distribute the new image data to at least one second terminal associated with the at least one sharing user based on the determined sharing settings set by the first user in response to the received share command from the first terminal.

2. The SNS server of claim 1, wherein the share command is received from the first terminal in response to the first terminal determining the new image data associated with the first video content is stored in an image management table.

3. The SNS server of claim 1, wherein the at least one processor is further configured to execute the computer readable instructions to:

receive a response to the new image data from the at least one second terminal, the response including response content from the at least one sharing user; and transmit the received response to the first terminal.

4. The SNS server of claim 1, wherein the at least one processor is further configured to execute the computer readable instructions to, identify the at least one sharing user based on settings of a chat group of the SNS, the chat group of the SNS including the first user.

5. The SNS server of claim 4, wherein the at least one processor is further configured to execute the computer readable instructions to:

post the new image data to the chat group based on the determined sharing settings set by the first user.

6. The SNS server of claim 1, wherein the at least one processor is further configured to execute the computer readable instructions to:

transmit the new image data to a timeline on the SNS associated with the first user based on the determined sharing settings set by the first user.

7. The SNS server of claim 1, wherein the at least one processor is further configured to execute the computer readable instructions to:

transmit the network location information and the time position information to the at least one second terminal, the network location information and the time position information causing the at least one second terminal of the at least one sharing user to play back the first video content starting from a desired time period prior to the time position within the first video content corresponding to the new image data.

8. The SNS server of claim 1, wherein the new image data is a screenshot image generated at the time position within the first video content.

9. A method of operating a user terminal, the method comprising:

receiving, using at least one processor, first video content from a social networking service (SNS) server;

receiving, using the at least one processor, a capture command to capture new image data of the first video content being played back from a first user;

generating, using the at least one processor, the new image data from the first video content in response to the received capture command, the generating the new image data including generating a screenshot based on the first video content and storing the screenshot in the user terminal as a table in association with time position information identifying a time position of the new image data within the first video content, the table further including date and time of generation of the new image data and network location information of the first video content;

receiving, using the at least one processor, a share command from the first user, the share command including information indicating sharing settings associated with the SNS, the sharing settings including at least one of a sharing the new image data in a chat group associated with the first user and sharing the new image data to the at least one sharing user with the first user; and transmitting, using the at least one processor, the share command, the new image data, and the time position information associated with the new image data to the SNS server, the transmitted share command causing the SNS server to distribute the new image data to at least one second terminal associated with at least one second user of the SNS selected by the first user based on the sharing settings set by the first user.

10. The method of claim 9, wherein the sharing settings includes information indicating a chat group of the SNS, the chat group including the first user; and the transmitting the share command to the SNS server further causes the SNS server to, identify the at least one second user based on settings of the chat group of the SNS, and transmit the new image data to the at least one second terminal associated with the identified at least one second user.

11. The method of claim 10, wherein the transmitting the new image data to the at least one second terminal includes:

posting the new image data to the chat group by the SNS server based on the sharing settings set by the first user.

12. The method of claim 9, wherein the transmitting the share command to the SNS server further causes the SNS server to:

transmit the new image data to a timeline on the SNS associated with the first user based on the sharing settings set by the first user.

13. The method of claim 9, wherein the transmitting the share command further includes:

the SNS server is further caused to transmit the network location information and the time position information to the at least one second terminal, the network location information and the time position information allowing the at least one second terminal to play back the new image data starting from a desired time period prior to the time position within the first video content corresponding to the new image data.

14. The method of claim 9, wherein the new image data is a screenshot image generated at the time position within the first video content.

15. The method of claim 9, the method further comprising:
storing, using the at least one processor, information associated with the new image data in a management table, the information including a video content identifier associated with the first video content, the network location information indicating a network location of the first video content.

16. The method of claim 9, the method further comprising:
determining, using the at least one processor, whether a current display mode of the user terminal is suitable for generating the new image data in response to the received capture command;
changing, using the at least one processor, the current display mode of the user terminal based on results of the determining whether the current display mode of the user terminal is suitable, wherein a suitable display mode is a full screen playback of only the first video content; and
generating, using the at least one processor, the new image data in response to the changed current display mode.

17. A non-transitory computer readable medium having computer readable instructions stored thereon, which when executed by at least one processor of a social network service (SNS) server, causes the SNS server to:
distribute first video content to a first terminal associated with a first user of the SNS;
receive a share command from the first terminal, the share command including a command to distribute new image data to at least one sharing user of the SNS selected by the first user, the at least one sharing user associated with the first user, and the new image data being a screenshot generated based on the first video content and stored in the first terminal as a table in association with time position information identifying a time position of the new image data within the first video content, the table further including date and time of generation of the new image data and network location information of the first video content;
receive the new image data from the first terminal and the time position information associated with the new image data form the first terminal;
determine sharing settings set by the first user on the SNS, the sharing settings including at least one of sharing the new image data in a chat group associated with the first user and sharing the new image data to the at least one sharing user associated with the first user; and
distribute the new image data to at least one second terminal associated with the at least one sharing user by sharing the new image data based on the determined sharing setting set by the first user in response to the received share command from the first terminal.

18. The non-transitory computer readable medium of claim 17, wherein the share command is received from the first terminal in response to the first terminal determining the new image data associated with the first video content is stored in an image management table.

19. The non-transitory computer readable medium of claim 17, wherein the SNS server is further caused to:
receive a response to the new image data from the at least one second terminal, the response including response content from the at least one sharing user; and
transmit the received response to the first terminal.

20. The non-transitory computer readable medium of claim 17, wherein the SNS server is further caused to:
identify the at least one sharing user based on settings of a chat group of the SNS, the chat group of the SNS including the first user; and
post the new image data to the chat group.

* * * * *